United States Patent [19]

Blevins

[11] Patent Number: 5,594,858
[45] Date of Patent: Jan. 14, 1997

[54] UNIFORM CONTROL TEMPLATE GENERATING SYSTEM AND METHOD FOR PROCESS CONTROL PROGRAMMING

[75] Inventor: Terrence L. Blevins, Round Rock, Tex.

[73] Assignee: Fisher-Rosemount Systems, Inc., Clayton, Mo.

[21] Appl. No.: 98,790

[22] Filed: Jul. 29, 1993

[51] Int. Cl.[6] ............................................. G06F 15/00
[52] U.S. Cl. ................................................. 395/326
[58] Field of Search ................................. 395/155–161

[56] References Cited

U.S. PATENT DOCUMENTS

| | | | |
|---|---|---|---|
| 4,443,861 | 4/1984 | Slater | 395/275 |
| 4,455,619 | 6/1984 | Masui et al. | 395/160 |
| 4,656,603 | 4/1987 | Dunn | 395/2 |
| 4,663,704 | 5/1987 | Jones et al. | 364/188 |
| 4,679,137 | 7/1987 | Lane et al. | 364/188 |
| 4,736,320 | 4/1988 | Bristol | 395/700 |
| 4,843,538 | 6/1989 | Lane et al. | 364/188 |
| 4,849,880 | 7/1989 | Bhaskar et al. | 395/161 |
| 4,866,638 | 9/1989 | Cosentino et al. | 395/159 |
| 4,910,691 | 3/1990 | Skeirik | 395/11 |
| 4,914,568 | 4/1990 | Kodosky et al. | 395/159 |
| 4,934,399 | 6/1990 | Cho | 137/14 |
| 4,965,742 | 10/1990 | Skeirik | 364/191 |
| 4,975,643 | 12/1990 | Buchwald | 324/207.12 |
| 4,976,144 | 12/1990 | Fitzgerald | 73/168 |
| 4,991,076 | 2/1991 | Zifferer et al. | 364/147 |
| 5,006,976 | 4/1991 | Jundt | 364/184 |
| 5,019,961 | 5/1991 | Addesso et al. | 364/192 |
| 5,021,976 | 6/1991 | Wexelblat et al. | 395/159 |
| 5,072,412 | 12/1991 | Henderson, Jr. et al. | 395/159 |
| 5,163,130 | 11/1992 | Hullot | 395/148 |
| 5,214,756 | 5/1993 | Franklin et al. | 395/159 |
| 5,226,118 | 7/1993 | Baker et al. | 395/161 |
| 5,257,349 | 10/1993 | Alexander | 395/159 |
| 5,287,439 | 2/1994 | Koga et al. | 395/133 |
| 5,293,476 | 3/1994 | Wolber et al. | 395/159 |
| 5,301,301 | 4/1994 | Kodosky et al. | 395/500 |
| 5,313,575 | 5/1994 | Beethe et al. | 395/159 |
| 5,353,400 | 10/1994 | Nigawara et al. | 395/161 |
| 5,353,401 | 10/1994 | Iizawa et al. | 395/161 |

FOREIGN PATENT DOCUMENTS

WO91/19237 12/1991 WIPO .

OTHER PUBLICATIONS

Microsoft Corporation; Microsoft Access Basic: An Introduction to Programming; 1992; p. 139–147.

Hollan et al.; *Graphics Interfaces for Simulation;* 1987; pp. 129–163.

Robinson et al.; *An Application of Object–Oriented Programming to Process Simulation;* Aug. 1988; pp. 1–9.

Walters et al.; *Modeling Made Easy: The Synthetic Intelligence (SI) Approach;* 1988; pp. 78–90.

Elmqvist, Hilding, An Object and Data–Flow Based Visual Language for Process Control, ISA/92–Canada Conference & Exhibit, Toronto, Ontario, Canada, Apr. 28–30, 1992, pp. 1–12.

Elmqvist, Hilding, Cooperating Distributed Control Objects, IFAC Symposium on Distributed Intelligence Systems, Arlington, Virginia, USA, Aug. 13–15, 1991, pp. 1–6.

(List continued on next page.)

*Primary Examiner*—Heather R. Herndon
*Assistant Examiner*—Joseph R. Burwell
*Attorney, Agent, or Firm*—Marshall, O'Toole, Gerstein, Murray & Borun

[57] ABSTRACT

A control template represents a selected function of a control process for a control environment and being used to generate a plurality of displayable views of the selected function. The template includes process control information such as algorithms and known control parameters of the control process, attribute information for the process environment such as inputs and outputs, at least one conversation set associated with the process control function information for relating specific control parameters of the control process in terms of a selected control template view and control method instructions that use the attribute information and at least one conversation set to form a process control solution. A system creates or modifies the control template.

41 Claims, 10 Drawing Sheets

OTHER PUBLICATIONS

*Proceedings of the Industrial Computing Conference*, vol. 1, Oct. 27–31, 1991, USA pp. 387–400, XP000344823, W. Maclay, *A Graphical Programming Environment for Data Acquisition and Process Control*.

*Control Engineering*, vol. 39, No. 11, Sep. 1992, New York, US pp. 98–101, XP000316280, J. S. Gerold, *Operator Interfaces Open New Windows on the Process*, see p. 99, left col., par. 2.

*Automatisierungstechnische Praxis–ATP*, vol. 32, No. 11, Nov. 1990, Munchen De pp. 529–536, XP000173230, H.–P. Kempny & U. Maier, *Herstellerneutrale Konfigurierung von Prozessleitsystemen*.

*IBM Technical Disclosure Bulletin*, vol. 33, No. 6A, Nov. 1990, US pp. 483–485, *Architecture for Separate User–Interface Software Development*.

Coote et al.; *Graphical and Iconic Programming Languages for Distributed Process Control: An Object Oriented Approach;* 1988; pp. 183–190.

Hsia et al.; *Constructed and Manipulation of Dynamic Icons;* 1988; pp. 78–83.

Sparks, Hugh; *Uniform Dataflow Software System for Global CIM Applications;* 1990; pp. 353–372.

Rosenstein et al.; *The HITS Icon Editor;* 1990; pp. 523–530.

Rasure et al.; *Data Flow Visual Languages;* 1992; pp. 30–33.

Jasany, Leslie C.; *Today's Software: No Programming Required;* Aug. 1992; pp. 12–14.

Chapman, William M.; *Knowledge Acquisition of Manufacturing Descriptions;* 1988; pp. 206–209.

Waterbury, Robert C.; *Software Powers Process Control;* 1989; pp. 46–48.

Kotchev et al.; *Structuring the Application Software for Real–Time Process Control;* 1990; pp. 189–196.

Symantec; *Norton Icon Editor,* version 2.0; 1991–92.

Earles, Todd; *Software Brings Simplicity and Realism to Industrial Oils;* May 1992; pp. 37–40.

Beltracchi, Leo; *A Framework For a Direct Perception/ Direct Manipulation Nuclear Power Plant Console;* 1992; pp. 43.3–1 to 43.3–4.

Sibbald et al.; *Software Process Enaction with VPL;* 1992; pp. 191–195.

Schoeniger, Eric; *Integration Gets the Job Done;* Apr. 1993; p. 20.

Elmqvist, Hilding; *A Uniform Architecture for Distributed Automation;* ISA/91 Conference & Exhibit; Anaheim, California, USA; Oct. 27–Nov. 1, 1991; pp. 1–10.

Deux et al., "The Story of O2", IEEE Transactions on Knowledge and Data Engineering, v. 2, No. 1, pp. 91–108.

van der Stok et al., "Control Software for EUTERPE", Proc. of 1993 Particle Accelerator Conf., v. 3, pp. 1820–1822.

McCrory, "Easy and effective application programs using DataViews", Proc. of 1993 Particle Accelerator Conf., v. 3, pp. 1952–1954.

Nilsson, "Object–oriented chemical process modelling in Omola", 1992 IEEE Symposium on Computer–Aided Control System Design (CACSD), pp. 165–217.

Mattsson et al., "The Ideas behind Omola", 1992 IEEE Symposium on Computer–Aided Control System Design (CACSD), pp. 23–29.

Pereira, "Putting OO to Work; results from applying the object–oriented paradigm during the development of real–time applications", Proc. of IEEE Workshop on Real–Time Applications, pp. 166–170.

Woods et al., "Acumen: a distributed, configurable platform for object–oriented control systems", IEE Colloquium on 'Object–Oriented Development', pp. 6/1–6/5.

Rovere, "OOP Techniques for control systems software design", IAEA Specialists' Meeting on Software Engineering in Nuclear Power Plants: Experience, Issues and Directions (Atomic Energy of Canada, Ltd.), pp. 112–118.

Gilbert, "Supporting user views", Computer Standards & Interfaces, v. 13, pp. 293–296.

UNIFORM CONTROL TEMPLATE GENERATING SYSTEM AND METHOD FOR PROCESS CONTROL PROGRAMMING

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

FIELD OF THE INVENTION

This invention relates in general to process monitoring and control systems and in particular to a system for creating control templates that have attributes, methods, and graphical views associated therewith that can be selected by a user to generate design process control solutions and from which the user can create a unique display of a view such as an engineer's view, operator's view, controller's view, and the like. Any variation of the attributes and methods with the engineer's view will be automatically reflected in all other views using those attributes and methods.

BACKGROUND OF THE INVENTION

Process control involves the use of instruments, control devices and systems for measuring and manipulating control elements such as valves to maintain one or more process variables, such as temperature, pressure and flow at target values selected to achieve a desired objective of a process including the safe and efficient operation of machines and equipment utilized in the process. Process control systems have widespread application in the automation of industrial processes such as those used in chemical, petroleum, and manufacturing industries, for example.

Control of the process is often implemented using microprocessor based controllers or computers which monitor the process by sending and receiving commands and data to hardware devices to control a particular aspect of the process or the entire process as a whole. The specific process control functions implemented by software programs in these microprocessors or computers may be individually designed, modified or changed through programming without requiring modifications to the hardware. For example, an engineer might cause a program to be written to have the controller read a fluid level in a tank (from a level sensor), compare the tank level with a predetermined desired level, and then open or close a feed valve based on whether the read level was lower or higher than the predetermined, desired level. The parameters may be changed easily by displaying an engineer's view of the process and then by modifying the program using the engineer's view.

In addition to carrying out the execution of control processes, software programs are also used to provide feedback in the form of an operator's display or view regarding the status of particular processes, to signal an alarm when a problem occurs, or to provide instructions or suggestions to an operator when a problem occurs. The operator who is responsible for the control process needs to view the process from his point of view. A display or console is typically provided as the interface between the microprocessor based controller or computer performing the process control function and the operator and also between the programmer or engineer and the microprocessor based controller or computer performing the process control function.

Systems that perform, monitor, control, and feed back functions in process control environments are typically implemented by software written in high-level computer programming languages such as Basic, Fortran or C and executed on a computer or controller. These high-level languages, although effective for process control programming, are not usually used or understood by process engineers, maintenance engineers, control engineers, operators and supervisors. Higher level graphical display languages have been developed for such personnel, such as continuous function block and ladder logic. Thus each of the engineers, maintenance personnel, operators, lab personnel and the like, require a graphical view of the elements of the process control system that enables them to view the system in terms relevant to their responsibilities.

For example, a process control program may be written in Fortran to require two inputs, calculate the average of the inputs and produce an output value equal to the average of the two inputs. This program could be termed the AVERAGE function and may be invoked and referenced through a graphical display for the control engineers. A typical graphical display may consist of a rectangular block having two inputs, one output, and a label designating the block as AVERAGE. A different program may be used to create a graphical representation of this same function for an operator to view the average value. Before the system is delivered to the customer, these software programs are placed into a library of predefined user selectable features. The programs are identified by function blocks. A user may then invoke a function and select the predefined graphical representations to create different views for the operator, engineer, etc. by selecting one of a plurality of function blocks from the library for use in defining a process control solution rather than having to develop a completely new program in Fortran, for example.

A group of standardized functions, each designated by an associated function block, may be stored in a control library. A designer equipped with such a library can design process control solutions by interconnecting, on a computer display screen, various functions or elements selected with the function blocks to perform particular tasks. The microprocessor or computer associates each of the functions or elements defined by the function blocks with predefined templates stored in the library and relates each of the program functions or elements to each other according to the interconnections desired by the designer. Ideally, a designer could design an entire process control program using graphical views of predefined functions without ever writing one line of code in Fortran or other high-level programming language.

One problem associated with the use of graphical views for process control programming is that existing systems allow only the equipment manufacturer, not a user of this equipment, to create his own control functions, along with associated graphical views, or modify the predefined functions within the provided library.

Thus, new process control functions are designed primarily by companies who sell design systems and not by the end users who may have a particular need for a function that is not a part of the standard set of functions supplied by the company. The standardized functions are contained within a control library furnished with the system to the end user. The end user must either utilize existing functions supplied with the design environment or rely on the company supplying the design environment to develop any desired particular customized function for them. If the designer is asked to modify the parameters of the engineer's view, then all other views using those parameters have to be rewritten and modified accordingly because the function program and view programs are often developed independently and are not part of an integrated development environment. Clearly, such procedure is very cumbersome, expensive, and time-consuming.

What is needed is a uniform or universal design environment that can easily be used, not only by a designer or manufacturer but also a user, to customize an existing solution to meet his specific needs for developing process control functions. Such a design environment would enable a process control designer or user to modify a standard process control function or create a unique customized process control function and create the graphical views to be associated with the modified or newly created process control function, all within a common environment. The design environment should have a common interface for both the creation of the function and for its associated engineers, operators, lab and maintenance personnel or other desired users such that when the engineer's function is modified or created, the modification or creation manifests itself in all other graphical views of the function. In addition, the design environment should have a common database structure of attributes and methods and the graphics associated with the process control function to allow modified or created process control functions to be represented in whatever graphical methodology that is desired or required by the designer, whether by ladder logic, continuous function block or other design languages required by the various engineer, operator, lab, and maintenance personnel as other desired graphical views.

SUMMARY OF THE INVENTION

The foregoing problems are solved and a technical advance is achieved by a system of the present invention for designing unique control templates defining process control functions for use in process control programming environments. Each control template includes both programmed functions and graphical views of the functions so that a particular graphical view can be selected. A uniform design environment is provided that allows a user to develop a process control function along with the associated function blocks or icons identifying the various views of the functions, which may be stored as a control template along with other templates in a common control template library.

In one embodiment, a process control programming environment is provided for designing unique control templates that define process control functions used in designing control solutions in a process control environment. The environment (often referred to as a workstation) includes a central processing unit having an input device such as a keyboard and/or a mouse and a graphical display for providing a visual interface between a user and the central processing unit. A control template generator stores process control function data in the form of attributes, methods, and graphical views associated with process control function represented by the unique control template. A control template library is used to store newly created as well as pre-existing control templates.

In another embodiment of the invention, a control template generator is provided that includes an attributes and methods language generator for storing the process control function data that defines the attributes and methods to be associated with a control template representing a specific process control function and a graphics generator for designing graphical views associated with the process control function represented by the control template such that the attributes and methods language generator and the graphics generator provide a uniform design environment for the creation of the control templates. The attributes and methods language generator provides design interface display screens that allow a user to define or select all the attributes to be associated with a particular process control function and to select or create the methods to be associated with the process control function. The graphics generator provides the user with a display screen interface which can be used to create graphical views that visually represent the attributes and methods selected by the user to define the process control function. The graphics generator provides a display screen interface in a manner similar to the attributes and methods language generator and allows the user to create graphical views to be associated with the control function. Such views include, for example only, an engineer's view, an operator's view, a control view, a maintenance view, and other views as desired. Once a user has designed a new control template, the control template generator stores the data representing the new control template in the control template library. The control template function data stored within the control template library can then be utilized in designing, modifying, and implementing process control programs and views to be included in displays for operator, maintenance, etc. Thus, each control template includes the algorithms, the inputs, the outputs, other attributes, and the program for performing the process control function. In addition, a plurality of conversation sets are associated with each attribute defined in the control template. The conversation sets define user interactions which may be invoked from a defined view that are related to the particular process control functions. The conversation sets include definitions of soft keys, windows, fields, etc., which enable the user to communicate with the template and insert new attribute values or modify old ones in the function. Thus, if the conversation limits, etc., associated with an attribute defined in the control template is modified, then all of the graphical views which reference this attribute would reflect this change.

An important technical advantage achieved by the present invention is that a user can modify existing templates or create his own control templates for use in process control, rather than relying entirely on the standard templates within the control template library furnished by the design environment manufacturer. Such created or modified template includes the necessary attribute definitions for creating any desired graphical view. Thus, a user can create a multitude of custom graphical views from the single modified or newly created control template for association with particular control functions and store the created views with the control functions for later reference.

BRIEF DESCRIPTION OF THE DRAWINGS

The novel features believed characteristic of the present invention are set forth in the appended claims. The invention itself, however, as well as other objects, features and advantages thereof will best be understood by reference to the following DETAILED DESCRIPTION of the preferred embodiment when read in conjunction with the accompanying figures, wherein like numerals represent like elements and in which:

FIG. 16 is a table which summarizes the elements of a control template.

DETAILED DESCRIPTION OF THE INVENTION

Figure 1:
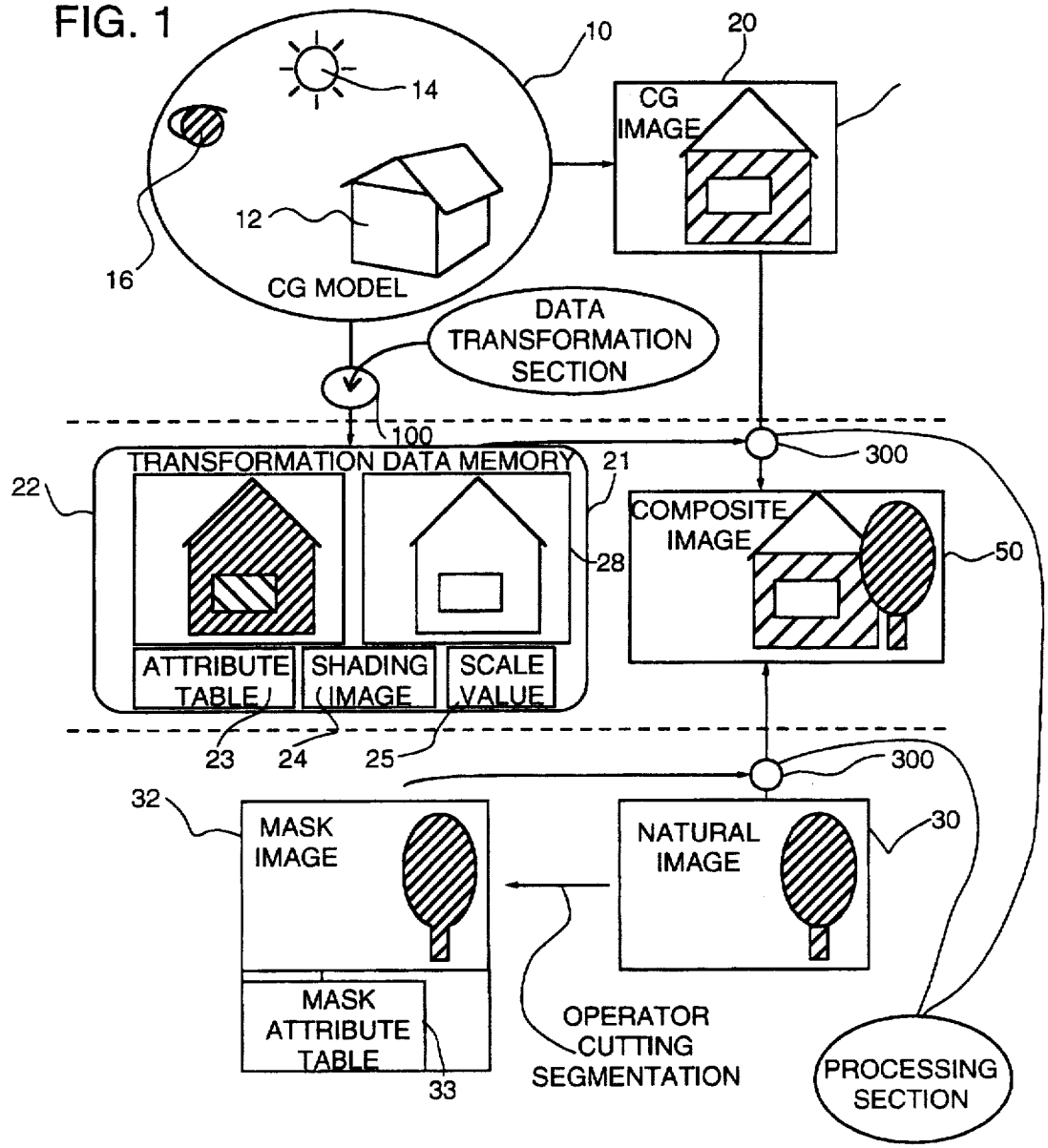
FIGS. 1, 2, and 3 are block diagrams illustrating a process control environment of the prior art.

A process control environment 100 is shown in FIG. 1 and is used to illustrate a control environment for implementing the prior art process controller. The process control system 100 includes an operator workstation 102, a lab workstation 104, and an engineering workstation 106 electrically interconnected by a local area network ("LAN") 108 for transferring and receiving data and control signals to and from the various workstations and controllers 110. The workstations 102, 104, 106 are shown connected by the LAN 108 to a plurality of the controller/multiplexers 110 that provide an electrical interface between the workstations and a plurality of processes 112. It is understood that the LAN 108 may contain only one workstation connected directly to a controller/multiplexer 110 or may contain many workstations 102, 104, 106 and many controller/multiplexers 110 depending upon the requirements of the process control environment. It is also understood that a single process controller/multiplexer 110 may be responsible for controlling several different processes 112 or may only be responsible for controlling a portion of a single process.

In this environment, a process control strategy is developed by creating a software control solution on the engineering workstation 106, for example, and transferring the solution via the LAN 108 to the operator workstation 102, lab workstation 104, and to controller/multiplexer 110 for execution. The operator workstation 102 and lab workstation 104 provide interface displays to the control/monitor strategy implemented in the controller/multiplexer 110 and communicates to one or more of the controller/multiplexers 110 to view the processes 112 and change control attribute values according to the requirements of the designed solution. In addition, the operator workstation 102 and lab workstation 104 may provide visual and audio feedback to the operator regarding the status and conditions of the controlled processes 112, as will be further discussed below. The engineering workstation 106 includes a central processing unit (CPU) 116 and a display and input/output or user-interface device 118 such as a keyboard, light pen and the like. The CPU 116 may also include its own memory 117. While not shown, it is understood that all workstations within the process control environment 100 include at least one central processing unit 116 electrically connected to a display and user-interface device 118 to allow interaction between a user and the CPU.

A function block library 122 is generally coupled to, but may be part of, the CPU 116 of the engineering workstation 106 and provides fixed function blocks for use in process control and monitoring. These function blocks are provided by the designer to the end user for use in the specific process control environment 100.

Figure 2:
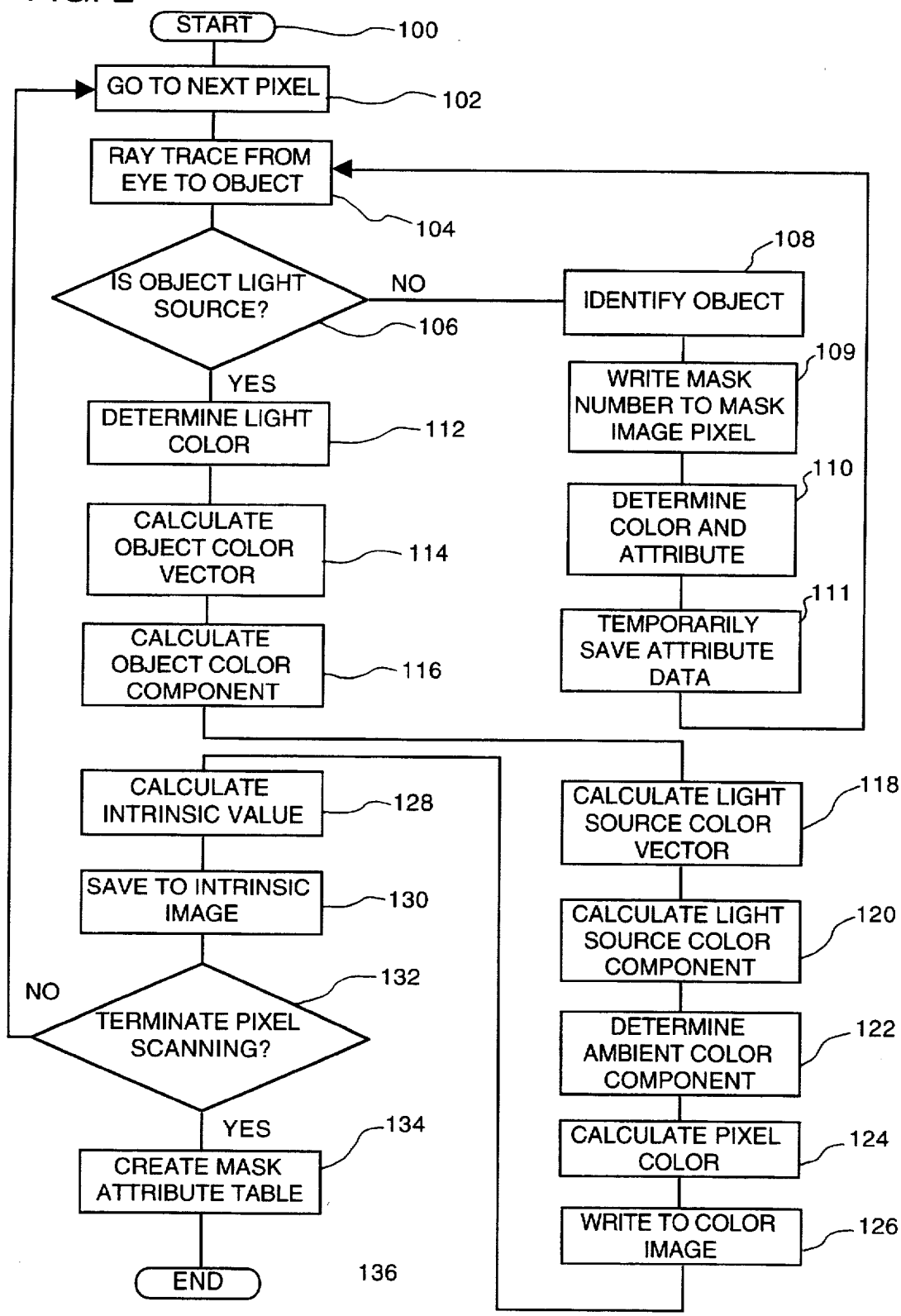

As shown in FIG. 2, the engineer's view of the function block library 122 contains a number of function blocks 22, 23, 24, 25, 26, 27, 28, 29, 30, and 31 that are used to define and access a particular function. These function blocks can be accessed by the CPU 116 as represented by dashed line 119 to define a monitor/control strategy on the display 118 as shown. Thus, the averaging input function block 22 (A1), representing a temperature measurement function, may be defined for temperature T1 and temperature T2 and may be selected and included in the display 118. If it is desired to average these temperatures, the function block 23 for the averaging function can be selected and the temperatures T1 and T2 coupled to the averaging template represented by function block 23. The output of the averaging function represented by function block 23 may be coupled to a PID function represented by function block 26 selected from the function block library 122. The output of the PID function represented by function block 26 may be connected to an output device function represented by function block 28 and selected from the function block library 122. Thus, a process control/monitor strategy can be represented by the various templates in the function block library 122, selected with function blocks 22, 23, 26, and 28 and coupled together on display 118 to illustrate the process control/monitor strategy. It is to be understood, however, that each of the control templates in the library 122 has fixed parameters associated with them so that they can be coupled to each other only in fixed or predetermined manners. Thus, if it were desired to have flow measurements connected to the averaging function represented by function block 23 instead of blocks 26 and 28, the system designer would have to create a new function block for storage in the library 122 so that it could later be viewed by the user in a manner similar to that illustrated in FIG. 2.

Figure 3:
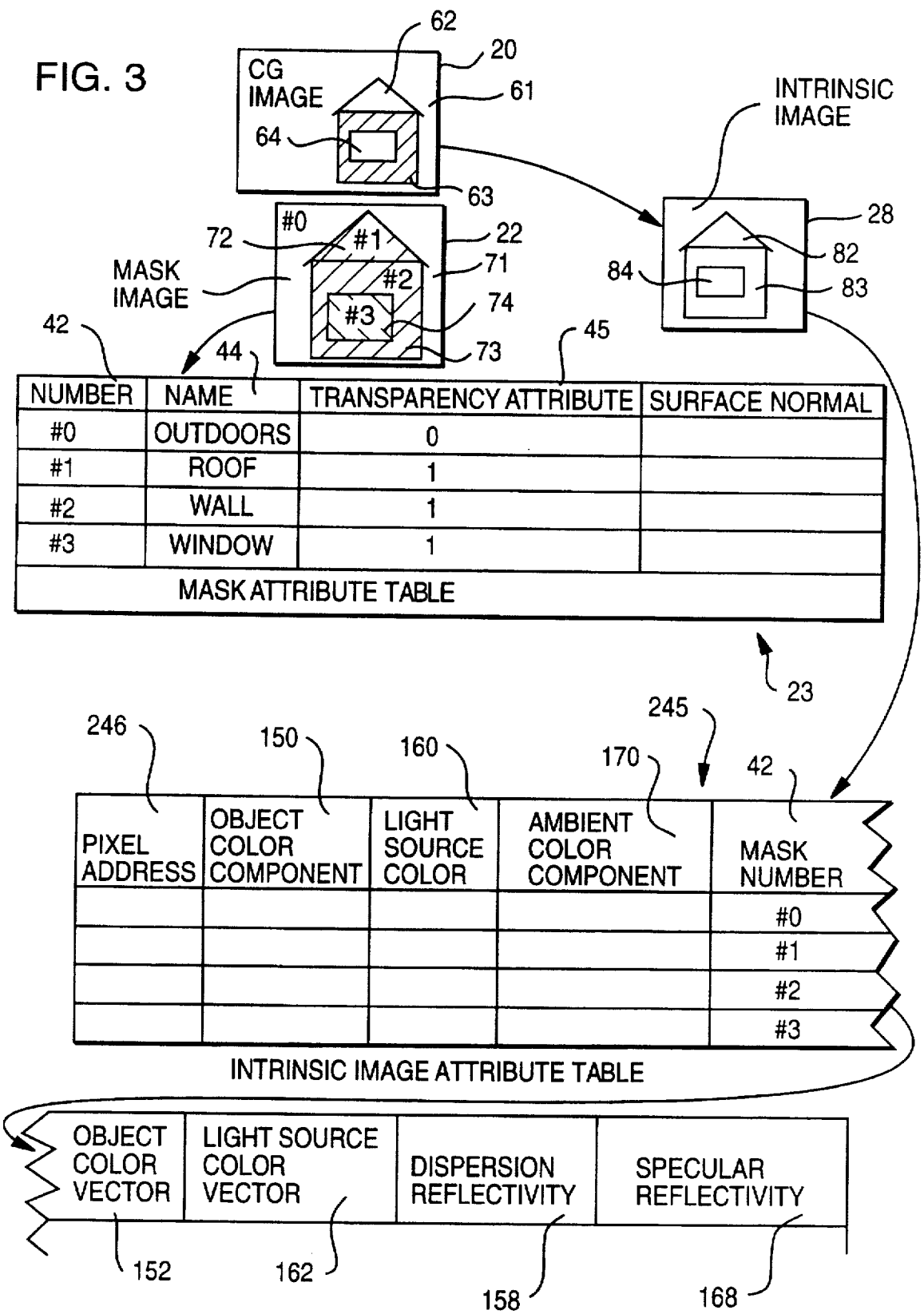

The creation of such a function block in the prior art is illustrated in FIG. 3. The new function 125, represented by function block 22, includes a process control function 123 that has inputs 10 and outputs 12, an algorithm 14 and parameters 16 and 18 of any known types associated with the process control function. Fixed data 20 are also associated with the process control function 123 and may include fixed filter coefficients, set time intervals and the like. An engineer's view 22 of the function is created to represent, and is considered part of, the created function block 125. The function block 125 is then stored and represents the created function block in the function block library 122 so that it can be accessed to pull up the created function block 125. It can then be added into the monitor/control strategy definition as shown on display 118 in FIG. 2 as described earlier.

It should be noted, however, that the function block 125 is specifically designed for the engineering view. Thus, any changes to the monitor/control strategy represented by block 118 in FIG. 2 will not show up in the operator's view, the maintenance view, the lab view, or any other view. If the change is essential to the operator, the controller, lab personnel, maintenance personnel and the like, each interface display would have to be modified to address and show the individual attributes of the new function block. In other words, there is no predefined view which could be referenced to modify the interface. This is the case because only the engineering view is defined and there is no support for predefined views needed to create the operator's display, the lab's display, or the other views that may be needed.

Figure 4:
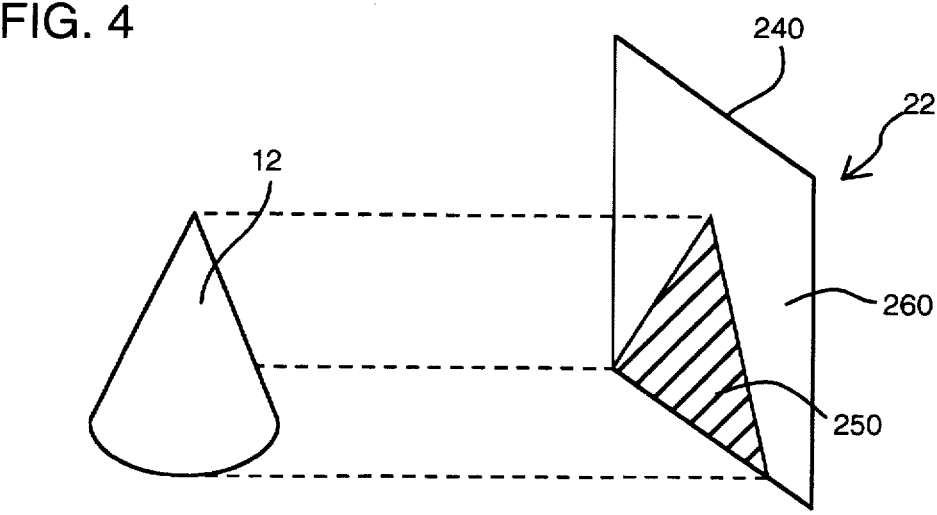
FIG. 4 is a generalized embodiment of a workstation of the present invention allowing a new control template to be created or an existing control template to be modified for only one view, such as an engineering view.

FIG. 4 is a basic block diagram of the preferred embodiment of the present invention. It includes all of the elements in the prior art as shown in FIG. 1 with the addition of a template generator 124 and the control template library 123 which form a control template system 120. Where like elements of the prior art correspond with like elements of the present system, identical numerals have been used. A control template according to the present invention is defined as the grouping of attribute functions that are used in controlling a process and the methodology used for a particular process control function, the control attributes, variables, inputs, and outputs for the particular function and the graphical views of the function as needed such as an engineer view and an operator view.

The control template system 120 includes the control template library 123 that communicates with the template generator 124. The control template library 123 contains data representing sets of predefined or existing control template functions for use in process control programs. These are the templates that generally come with the system from the system designer to the user. The novel template generator 124 of the present invention provides an interface that allows a user to create new control template functions or modify existing control template functions, both of which may also be stored in the control template library 123.

The template generator 124 includes an attributes and methods language generator 126 and a graphics generator 128. The attributes and methods language generator 126 provides display screens that allow the user to define a plurality of attribute functions associated with the creation of a new control template function or modification of a particular existing control template function, such as inputs, outputs, and other attributes, as well as providing display screens for enabling the user to select methods or programs that perform the new or modified function for the particular control template. The graphics generator 128 provides the means for designing graphical views to be associated with particular control templates. As will be further discussed below, a user utilizes the data stored by the attributes and methods language generator 126 and the graphics generator 128 to completely define the attributes, methods, and graphical views for a control template. The data representing the created control template function is preferably stored in the control template library 123 and thereafter can then be selected and used by an engineer in the design of process control solutions.

Figure 5:
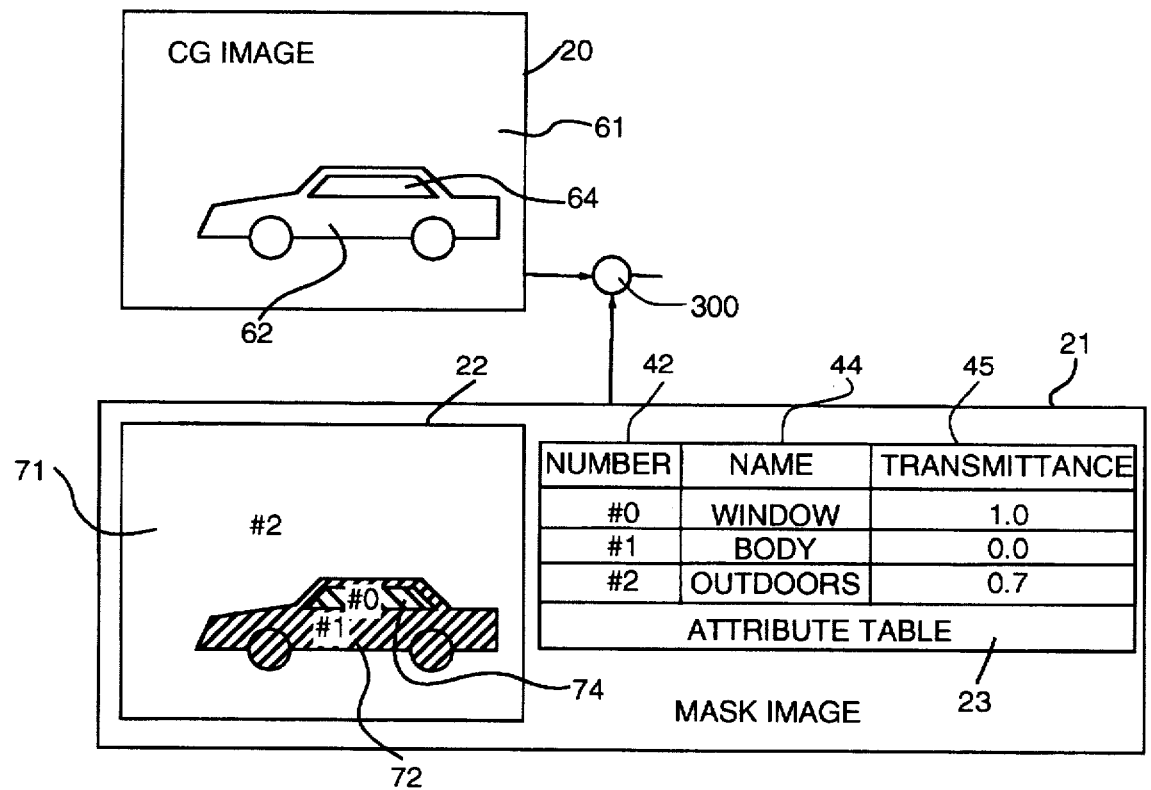
FIGS. 5A–G are basic block diagrams of the 5 preferred embodiment of the present invention.
Figure 5A:
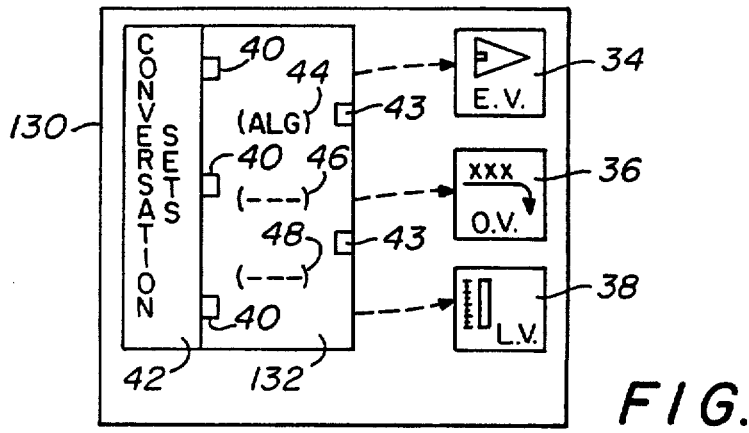

FIGS. 5A–G illustrate how a control template 130 shown in FIG. 5A can be created or an existing control template modified by the present invention to customize a solution to meet specific needs for developing a process control function such as modifying an existing standard process control function or creating a unique customized process control function and create the graphical views to be associated with the modified or newly created process control function, all within a common process control environment. Thus, using the control template system 120 shown in FIG. 4 and following the instructions as illustrated herein relating to FIGS. 6–15, the control template 130 shown in FIG. 5A can be created. The created control template includes the process control function 132 again designated with attributes such as inputs 40 and outputs 43. It includes the algorithm 44 necessary for performing the function and parameters 46 and 48 upon which the algorithm 44 may operate to utilize the inputs 40 and outputs 43 to provide the process control function desired. As will be discussed in greater detail below, a plurality of conversation sets 42 are created and associated with the process control function 132. These conversation sets relate to the parameters of the process control function in terms of the engineer's view, the operator's view, the controller's view, the maintenance view and other views as desired. Control template views 34, 36, and 38 are shown created as a part of the process control template 130 and identified from the standpoint of an engineer's view, operator's view, and lab view. Clearly, other views could be associated with the conversation sets 42. These control template views 34, 36, and 38 are then stored in the control template library 123 as shown where they can be selected by the user through the interface 118 to define control/monitor strategy at the engineer's workstation 106 or to create displays using predefined template views for operator or lab interfaces to the control/monitor strategy in the workstations 102 and 104.

Figure 5B:
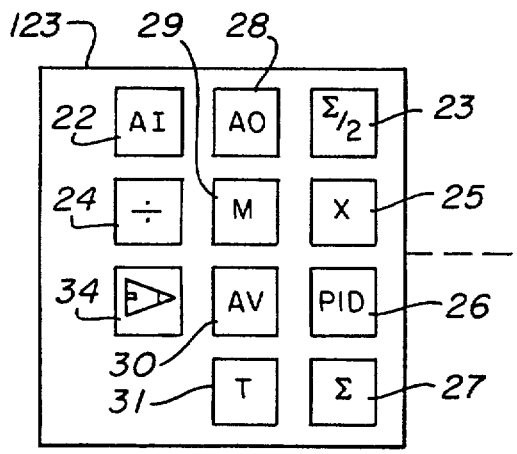
Figure 5C:
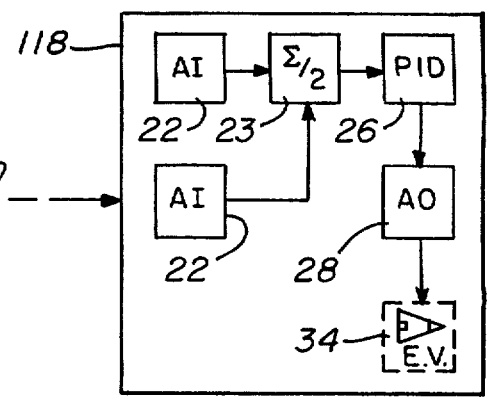

Suppose, for example, that the engineer desires to create an engineer's view of an amplifying function 34 (shown in phantom) to the output of the output device function 28 shown in FIG. 5C. He creates the engineer's view of the template 130 shown in FIG. 5A using the template generator 124 in FIG. 4 as will be shown hereafter. At the same time, he also creates the conversations sets 42 that relate to the operator's view, the lab view, the maintenance view, and other needed views accordingly. Thus, if the amplification function 34 requires certain voltage limits for the engineer's view 118, the lab view may need to indicate that change while the operator's view may not even have the change shown thereon. However, whatever change made on the engineering view that is necessary to be shown in the other views will be made during the creation of the process control template 130 as will be shown hereafter.

The engineer's view of the control template library 123 as shown in FIG. 5B will include the data 34 representing the new control template 130. The engineer can then select data 34 from FIG. 5B to access the newly created engineer's view of the control template 130 and add it to the engineer's interface display 118 in FIG. 5C of the defined monitor/control strategy.

Figure 5D:
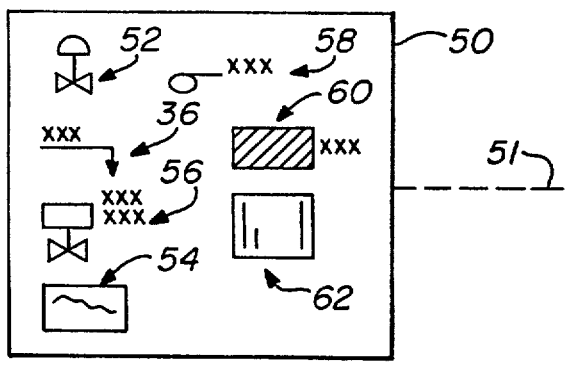
Figure 5E:
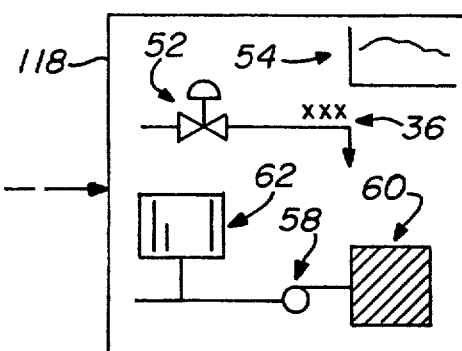

In like manner, the operator's view 50 of the control template as shown in FIG. 5D will include the data 36 created for the new control template 130. The operator can then select data 36 from the view in FIG. 5D to access the newly created operator's view of the control template 1.30 and add it to the operator's interface display 118 in FIG. 5E which is constructed using other stored data 52, 54, 58, 60, and 62 from the operator's view in FIG. 5D.

Figure 5F:
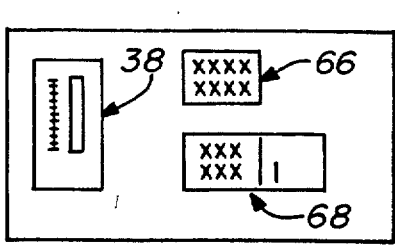
Figure 5G:
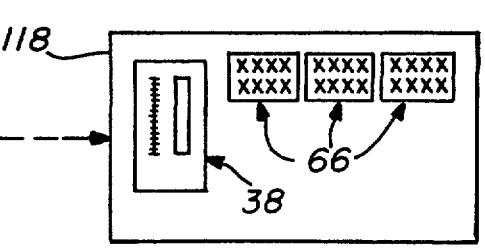
Figure 6:
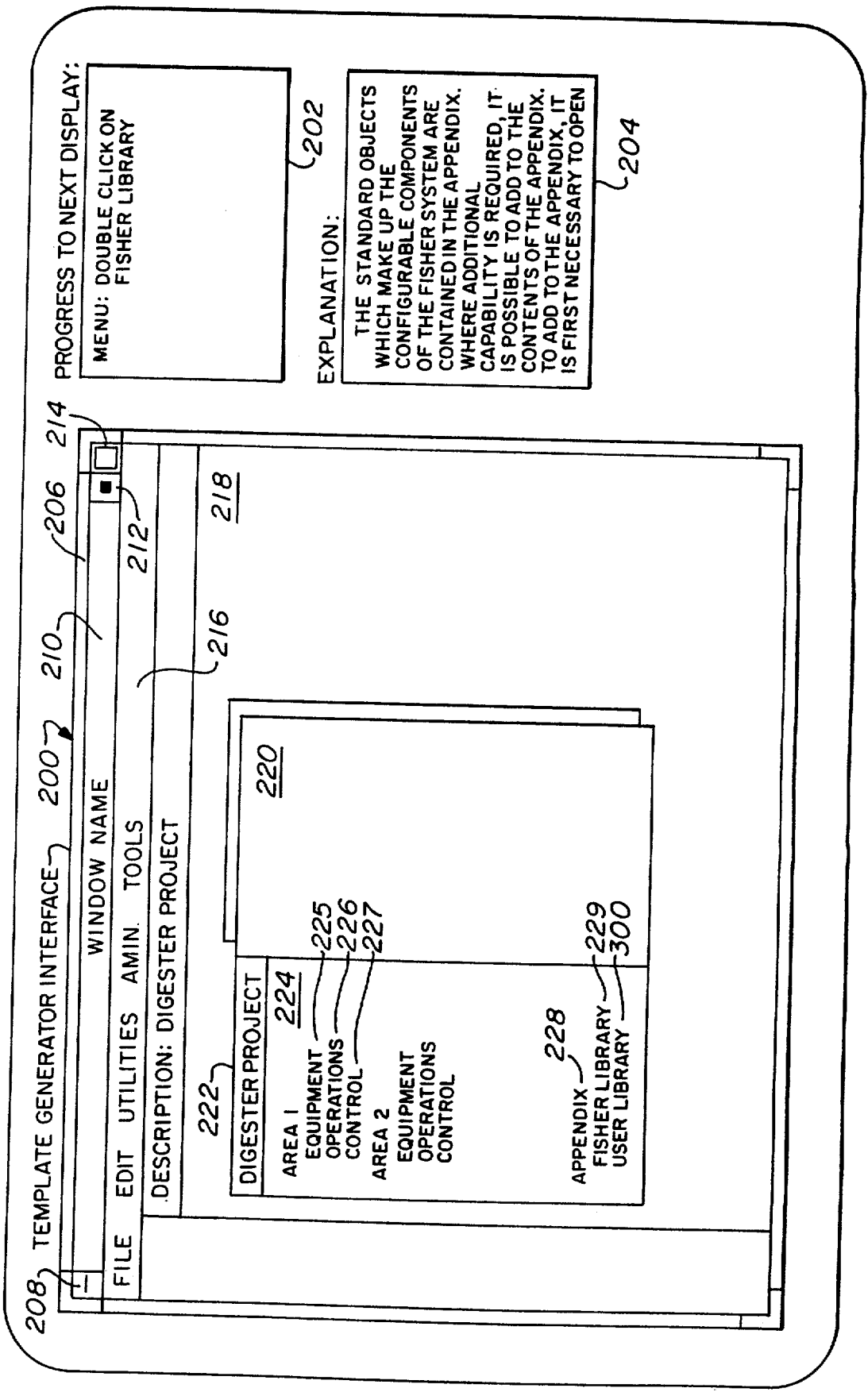
Figure 7:
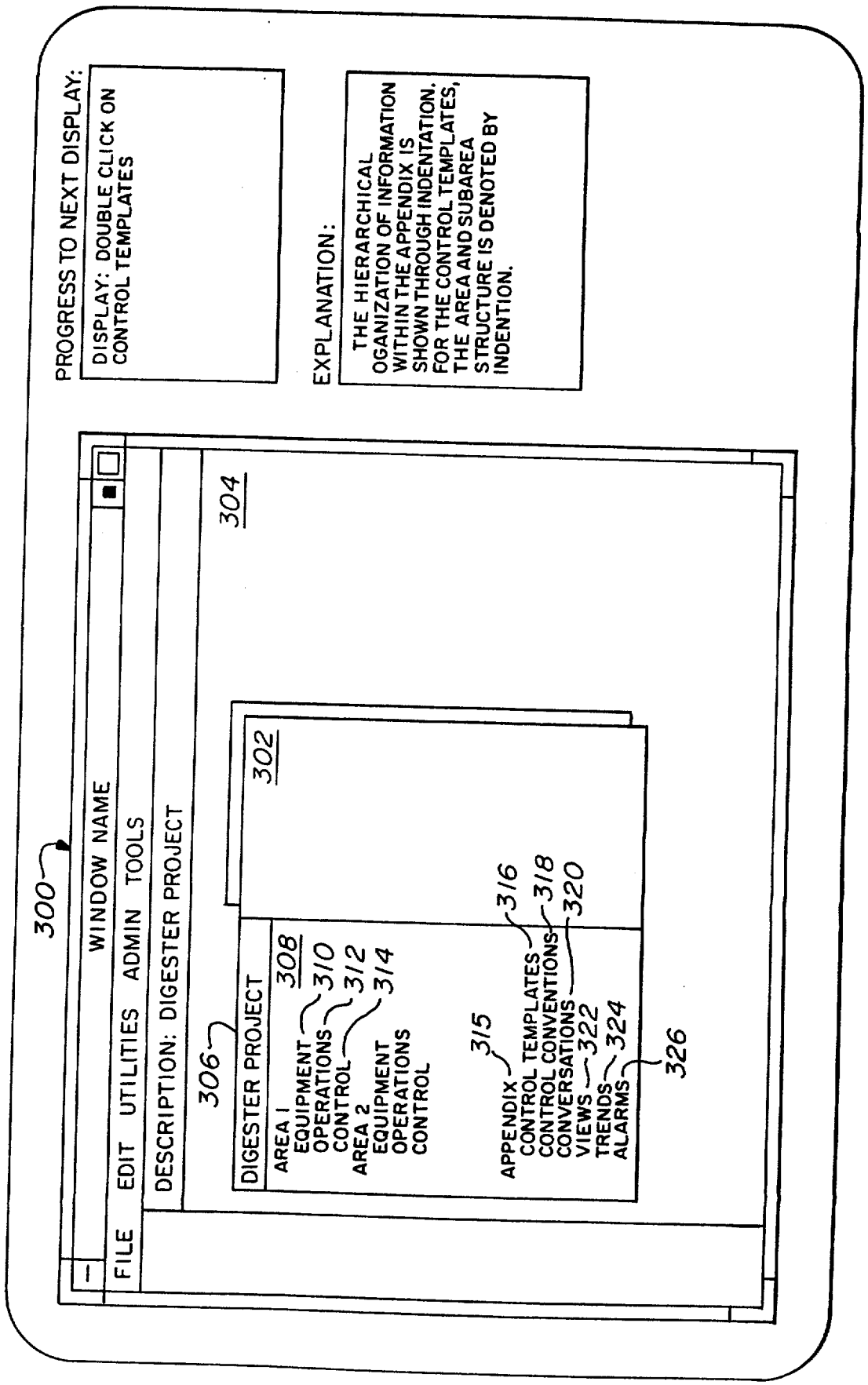
Figure 8:
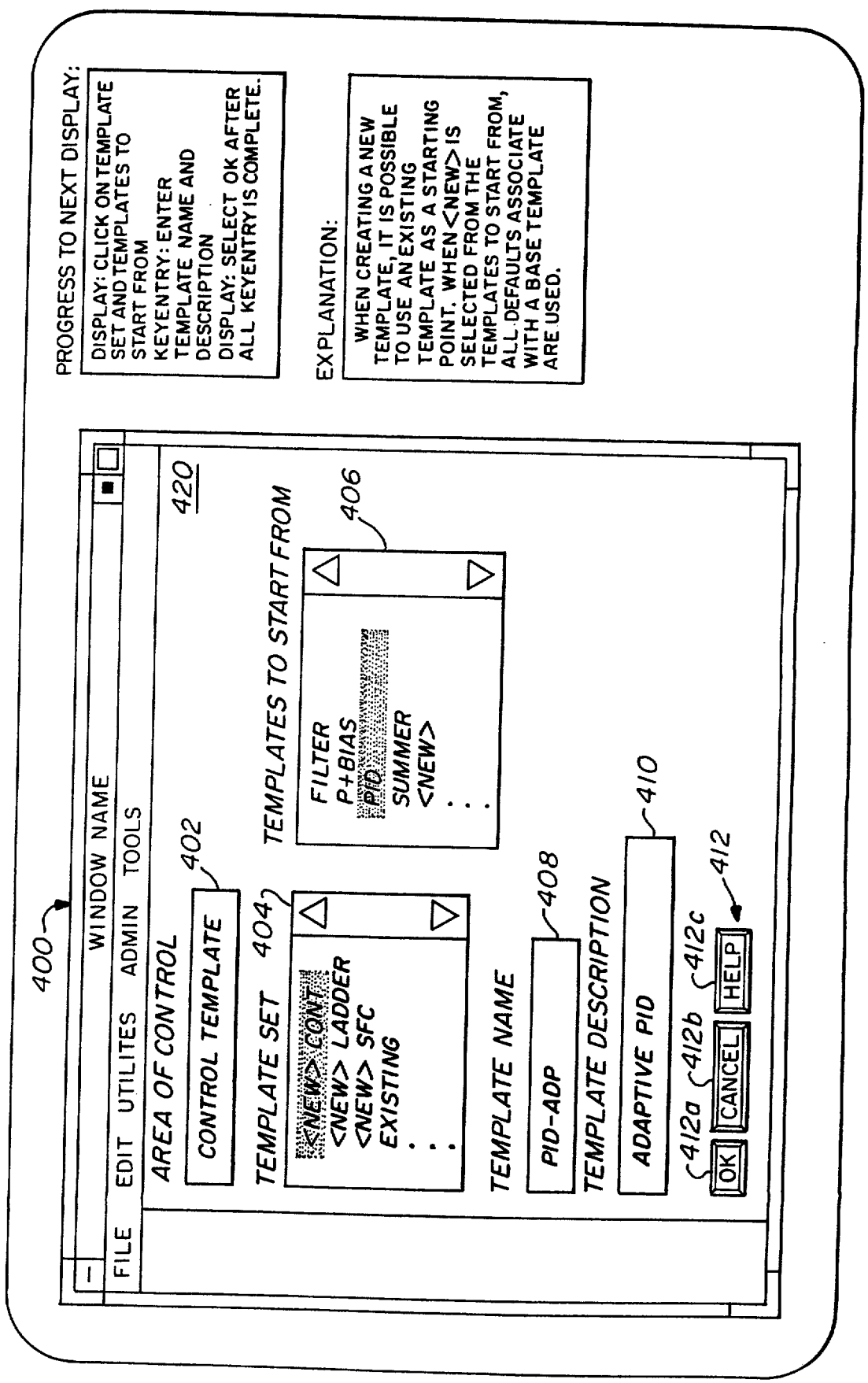
Figure 9:
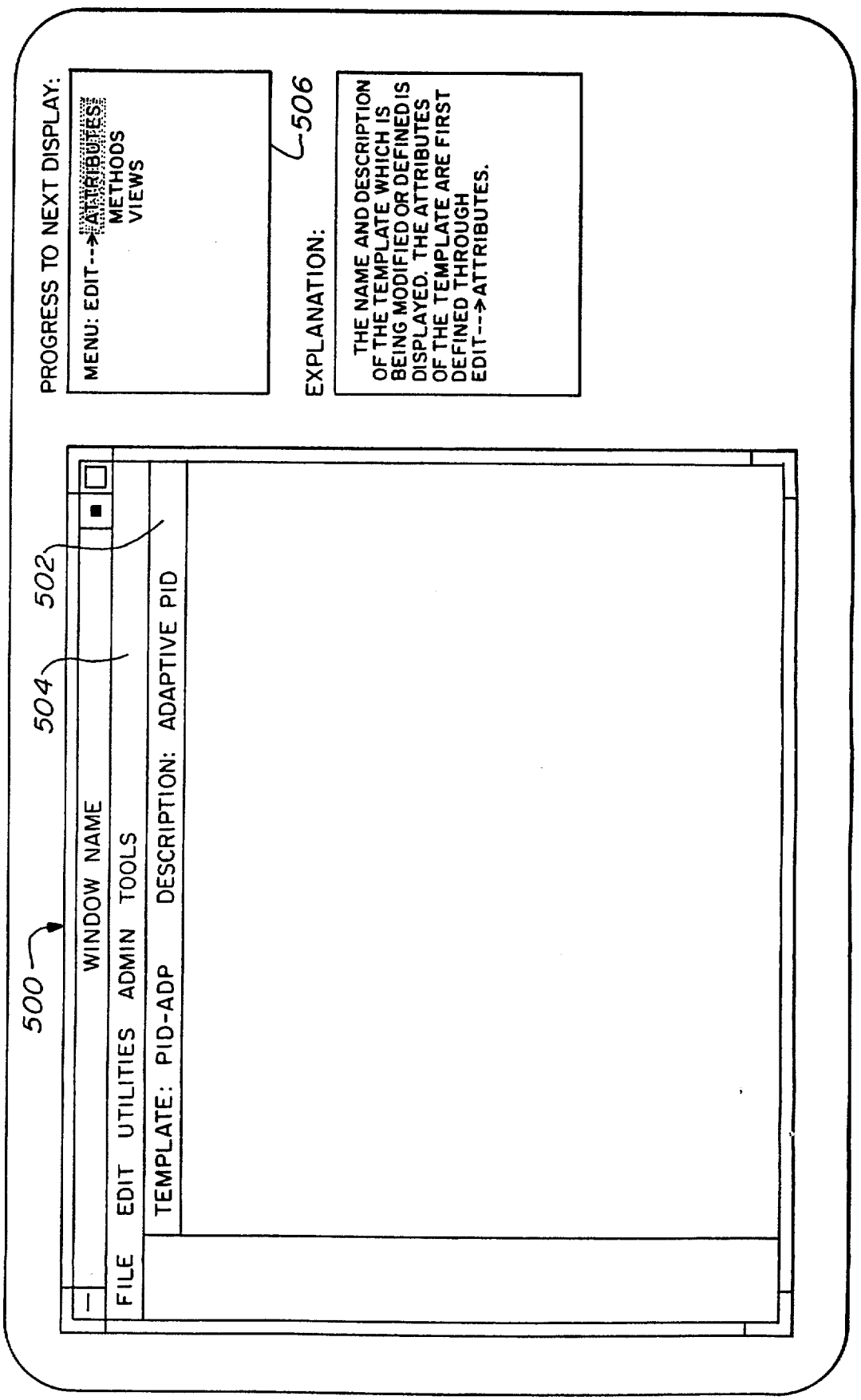
Figure 10:
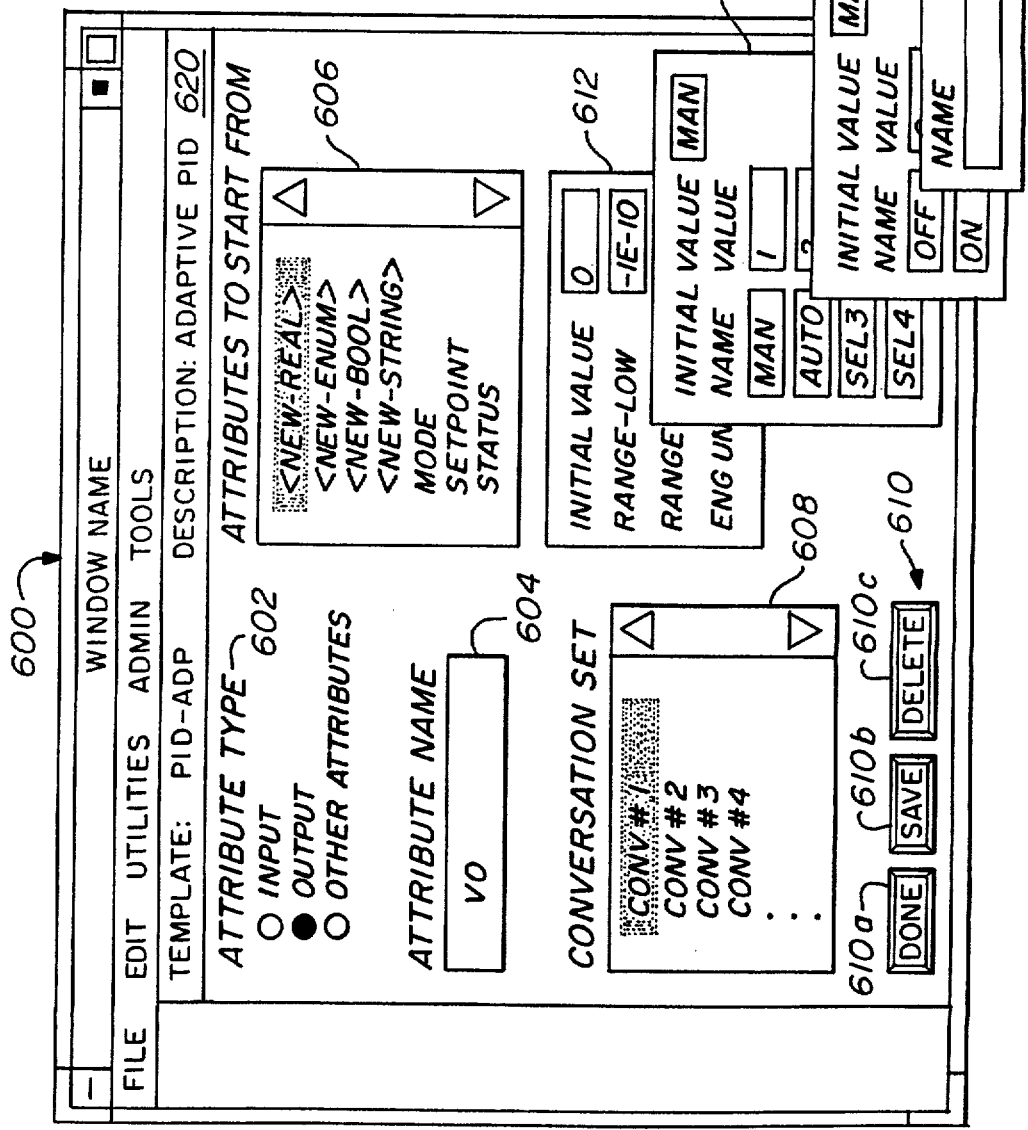
Figure 11:
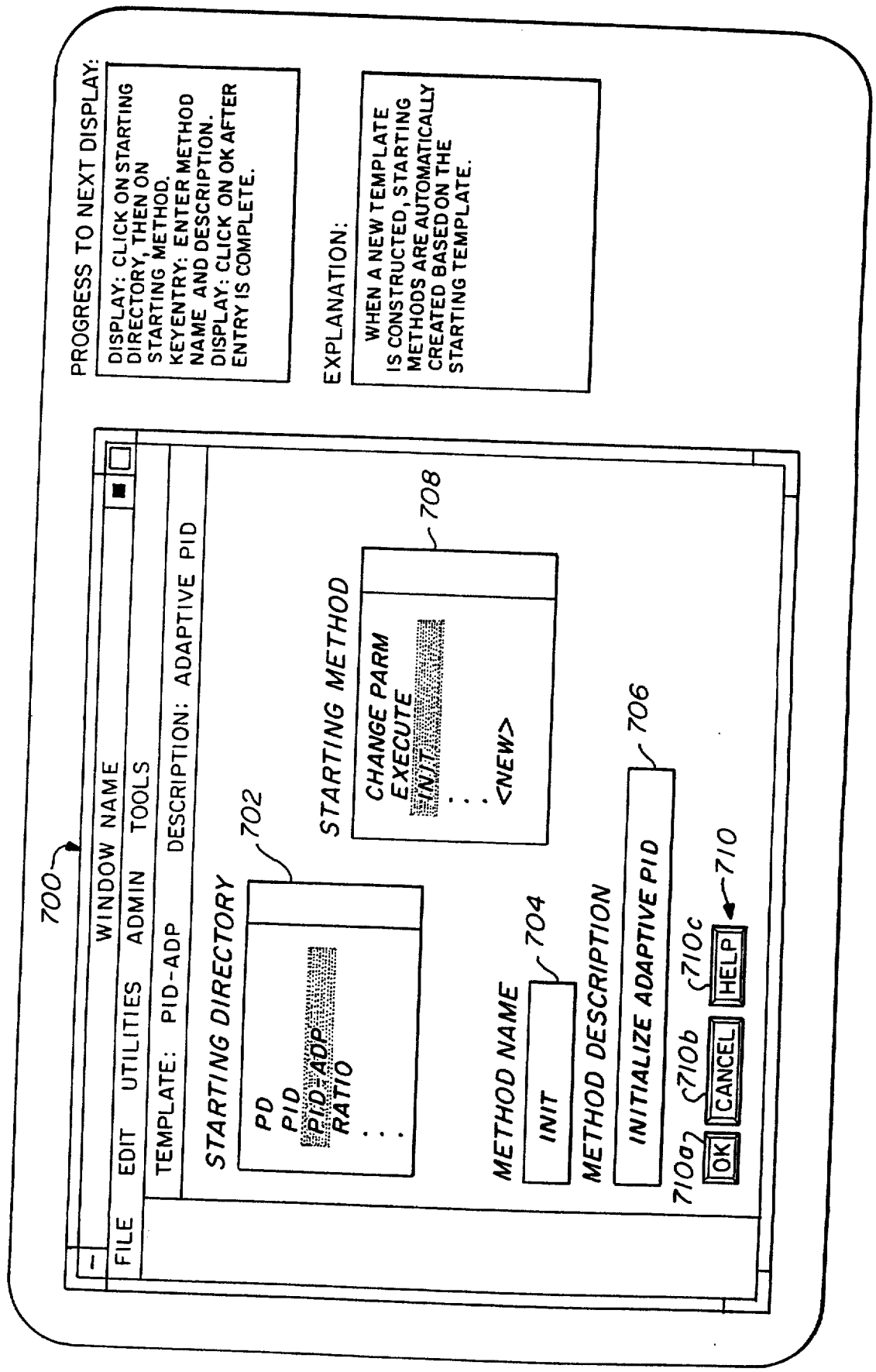
Figure 12:
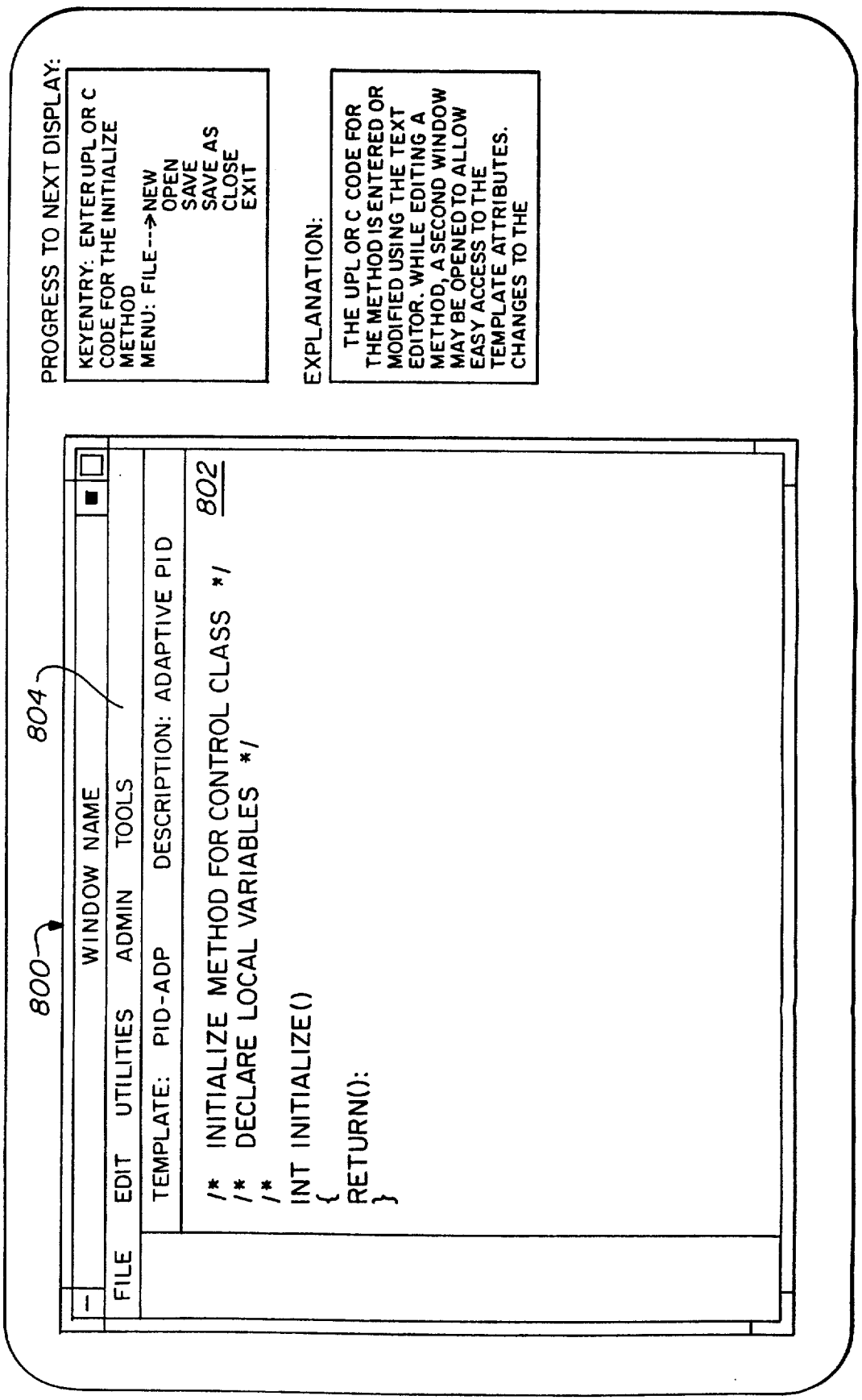
Figure 13:
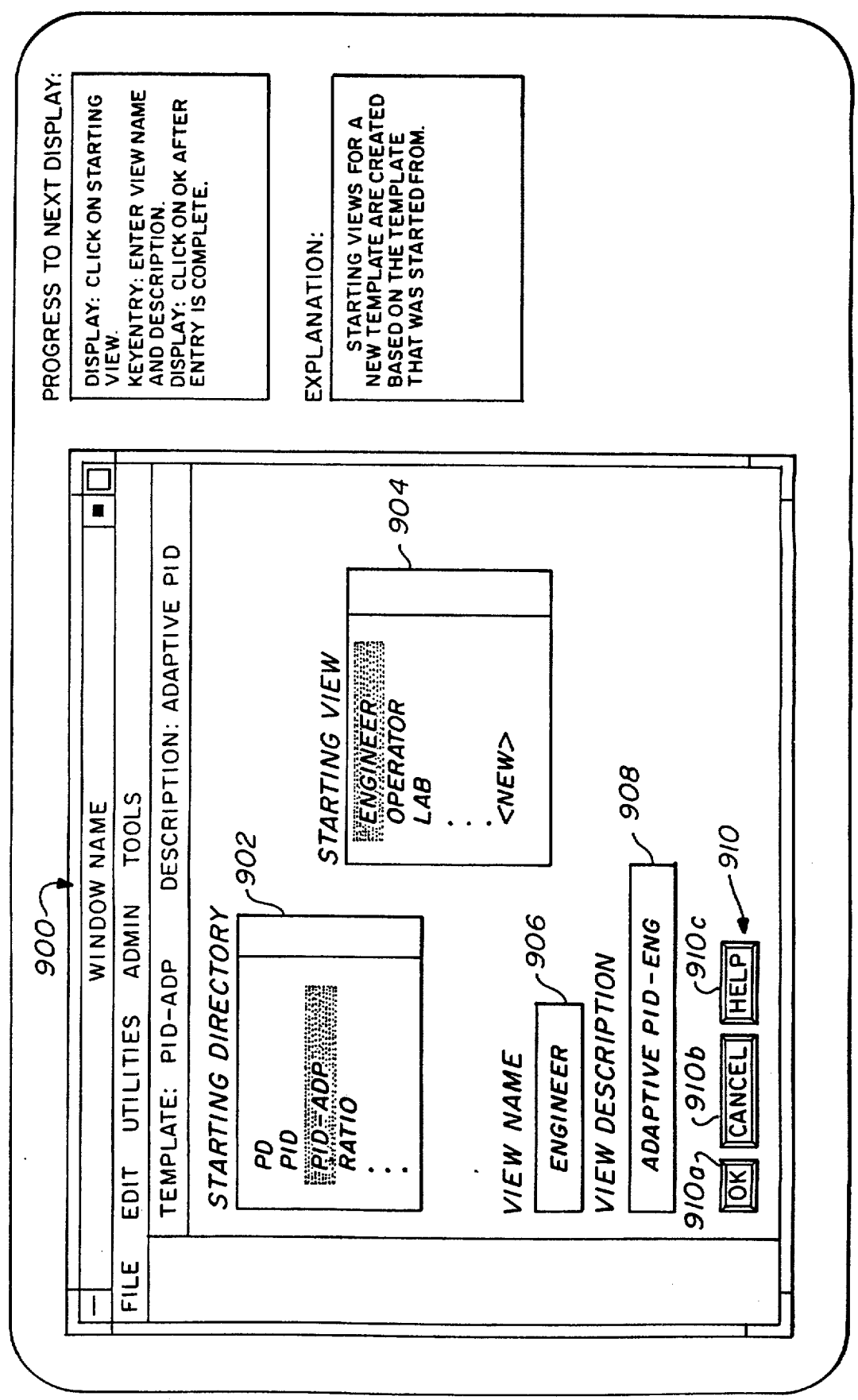

Again, in like manner, the lab view 64 of the template 130 is shown in FIG. 5F. It includes data 38 representing the newly created lab view of the control template 130 as well as other data 66 and 68. The lab interface display 118 in FIG. 5G is then constructed using the lab view 64 of the newly created control template 130.

Thus, the created process control template 130 forms a common or universal environment which, when created or modified through an engineer's view, for example, will modify all other necessary views accordingly thus eliminating the need to create separately additional templates for each of the other views. Notice in FIG. 5A that control template blocks 34, 36, and 38 representing the various views are part of the template 130 and are stored in the control template library 123 such that at the engineer's workstation an interface display for a workstation is created. For any of the workstations shown in FIG. 4, any one of the predefined views can be obtained by accessing the library 123 and designating the particular template function block desired. Consider now the details of the creation of a new control template or the modification of an existing control template.

Figure 6:
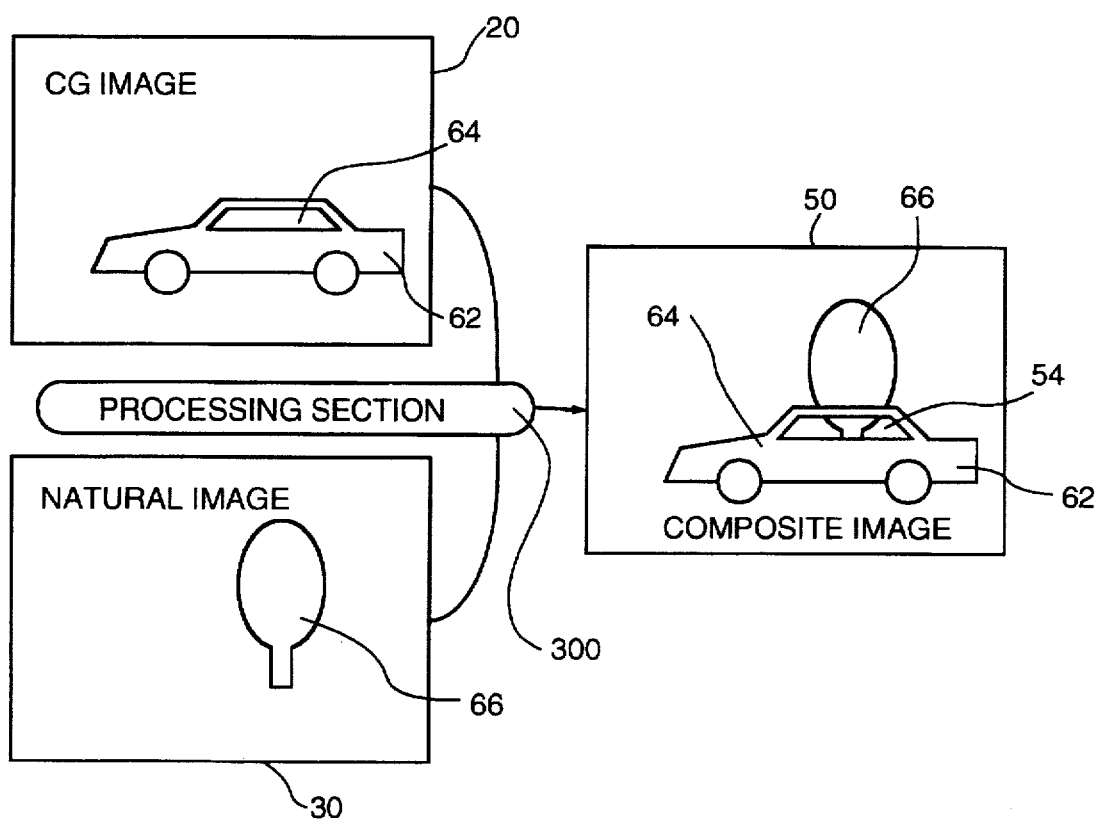
FIGS. 6–13 are successive screen displays of a workstation in the environment of FIG. 4 for illustrating how a designer would create or modify a control template according to the invention.

Referring to FIG. 6, a screen display ("window") 200 on display 118 illustrates a template generator interface that allows a user to enter into communication with the CPU 116 of workstation 106 for the purpose of defining control templates by their associated functions. The screen or window 200 appears on the display 118 of the workstation 106 in this illustration, although it is understood that multiple engineering workstations may exist in the environment 100. Next to the window 200 is a reference block 202 entitled "PROGRESS TO NEXT DISPLAY" that represents information that can be selected to indicate keystroke sequences required by the window 200 and a reference block 204 entitled "EXPLANATION" that represents information that can be selected to provide an explanation of the purpose of particular portions of the window 200. It is understood that reference blocks 202 and 204 do not appear as part of the window 200 or as part of the display 118 unless selected, but are provided in FIG. 6 and, like reference blocks, are shown in the following figures as an aid to understanding this specification.

The template generator interface window or display screen 200 includes a number of elements that are common to computer windowing environments such as X-Windows, MicroSoft Windows, or OS/2 Presentation Manager and will therefore be only briefly described. The window 200 contains a border or frame 206 around the perimeter that defines the size and location of the window with respect to the display 118. It is understood that typical window environments allow many different windows to be viewed at one time within the display 118. Within the border 206 of the template generator interface screen 200, a number of control points are found. The control points include a control box 208 for moving, sizing, and closing the screen or window 200, a title bar 210 for display of the window's program name or title, a minimize button 212 for collapsing the screen or window 200 into a small iconic representation while still allowing the program to execute, a maximize button 214 for expanding the template interface screen or window 200 to the full size of the display screen, and a menu bar 216 for providing pull-down menu commands within the screen or window 200. The rest of the area within the border 206 is the working area 218. This area provides the graphical and textual interface between the user and the program of the control template generator 124 to allow the user to communicate with the CPU 116 to create or modify a selected control template. The above-described window elements are well known in the art and will not be further discussed.

Within the working area 218, a graphical representation of an open book 220 appears. The book 220 provides a visual interface between the user and the template generator 124. This book 220 allows a user to read and select data representing a control template that exists or data that is to be associated with a control template that is to be created. The CPU 116 of the workstation 106 is used for the selection of data prompts causing the generation of display screens that enable creation, execution, and monitoring of process control programs and with the template generator 124 for the purpose of selecting display screens that allow creating and/or editing of control templates. The book 220 includes a title portion 222 and a selection portion 224. The title portion 222 provides the user with the name of the particular project, or book, that is currently selected or opened. The selection portion 224 provides a list of data prompts related to processes associated with the particular project that may be selected by a user to create the unique control template or modify an existing control template. It is understood that a user "selects" particular commands, functions or portions of the window 200 in any conventional windowing manner, such as by double clicking a mouse (not shown) on the prompts or by entering a command key sequence on the user-interface device such as a keyboard shown as part of display 118.

In FIG. 6, the name of an exemplary selected project entitled "DIGESTER" is shown in the title block 222 and the particular processes associated with the DIGESTER project are designated "Area 1" and "Area 2" in selection portion 224. Within each of the Area 1 and Area 2 references there are screen prompts defined as "EQUIPMENT", "OPERATIONS", and "CONTROL" subreferences. The EQUIPMENT subreference prompt selects a display screen that relates to a plant arrangement of physical equipment associated with the DIGESTER project, as well as diagnostic interface screens for monitoring the equipment. The OPERATIONS subreference prompt selects a display screen that relates to process control programs and associated operator interfaces that have been developed for the Area 1 and Area 2 references within the DIGESTER project. The CONTROL subreference prompt selects a display screen that relates to control/monitor strategy definitions associated with the Area 1 and Area 2 references. This information may be placed in a controller/multiplexer to provide control or monitoring functions to be viewed by the workstation. A user may select a subreference prompt from one of the defined references (Area 1 or Area 2) for the purpose of displaying and then editing or modifying pertinent screens or developing process control programs that are associated with particular aspects of the selected areas. Upon selection of the CONTROL subreference prompt, the user is provided with a control/monitor strategy interface display screen that provides screen prompts that allow a particular process control program to be created or modified that relates to the selected subreference.

At the bottom of the selection area 224, an "APPENDIX" 228 is shown with screen prompts that include a "FISHER LIBRARY" 229, and a "USER LIBRARY" 230. The FISHER LIBRARY screen prompt 229 selects a system-provided library that contains predefined or existing control template data display screens stored within the control template library 123. These are the templates that come with the system from the designer. The USER LIBRARY screen prompt 230 selects user-created control templates stored in the control template library 123 for use in process control programs. By selecting the USER LIBRARY screen prompt 230 in the APPENDIX of the selection area 224, the user selects a first data display screen for communicating with the template generator 124 for the purpose of creating or editing existing control templates 316 as shown in FIG. 7.

Figure 7:
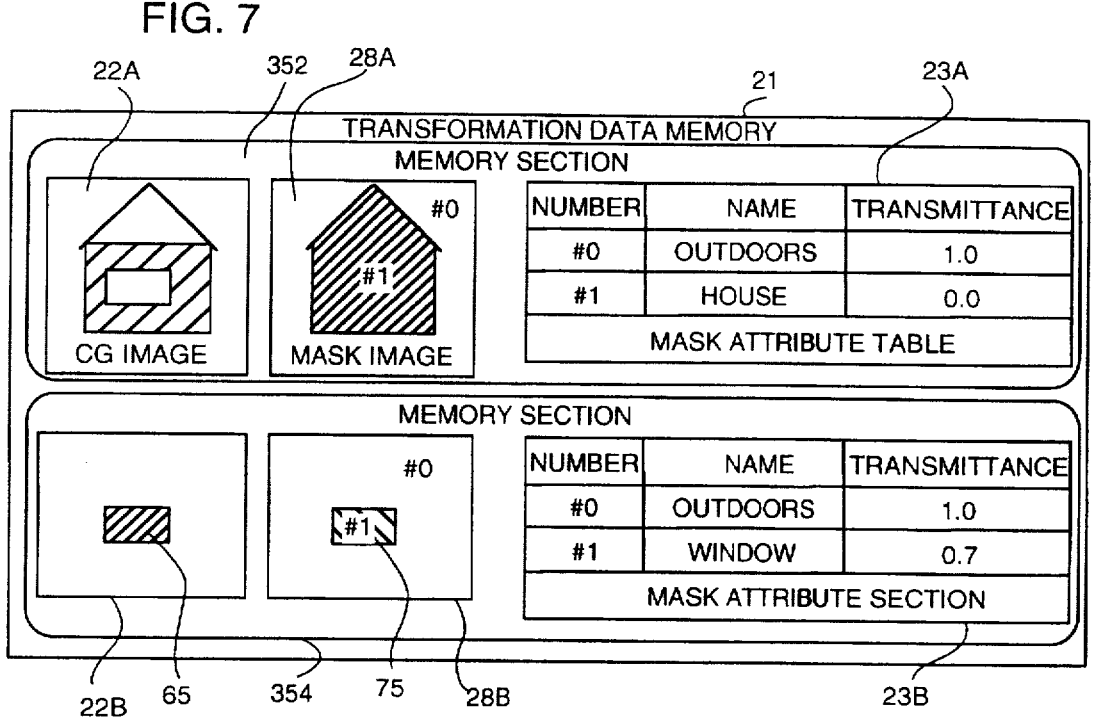

Referring to FIG. 7, a window 300 is shown corresponding to the first data communication screen including screen prompt 316 for the USER LIBRARY selection of existing control template data and other system features 318, 320, 322, 324, 326 for the selected project in the APPENDIX 315 thereof. As in FIG. 6, an open book 302 is shown in window area 304 having a title block 306 designating the DIGESTER project and having a selection portion 308 designating the same Area 1 and Area 2 references and corresponding subreferences 310, 312, and 314 associated with the project. However, the screen prompts of the APPENDIX 3 15 have changed to reflect a variety of tools or screen prompts associated with the USER LIBRARY. These screen prompts include CONTROL TEMPLATES 316, CONTROL CONVENTIONS 318, CONVERSATIONS 320, VIEWS 322, TRENDS 324, and ALARMS 326. The CONTROL TEMPLATES tool prompt 316 in the APPENDIX 315 selects the defined or existing control templates that are stored in the control template library 122. The CONTROL CONVENTIONS tool prompt 318 selects predefined control sheets as display screens for use in defining programs for the selected process control functions. The CONVERSATIONS prompt 320 selects an editable screen for enabling data communication between a workstation and a user that can be associated with a particular selected control template attribute such as temperatures, pressures, and the like, to be further discussed below. The VIEWS tool prompt 322 selects user editable attributes associated with the size, color, and like attributes of the operating environment of the selected process control function. The VIEWS tool prompt 322 should not be confused with the graphical views that are associated with particular control templates. The TRENDS tool prompt 324 and the ALARMS tool prompt 326 select stored user editable attributes such as color, sound level, or the like of process trends and alarms associated with the selected process control function (not shown).

The user begins creating a control template by selecting the CONTROL TEMPLATES tool prompt 316 of the APPENDIX 315 within the selection area 308. Once selected, the window 300 changes to a control template interface screen as shown in FIG. 8 to allow a user to begin defining specific attributes to be associated with a particular function, as discussed below.

Figure 8:
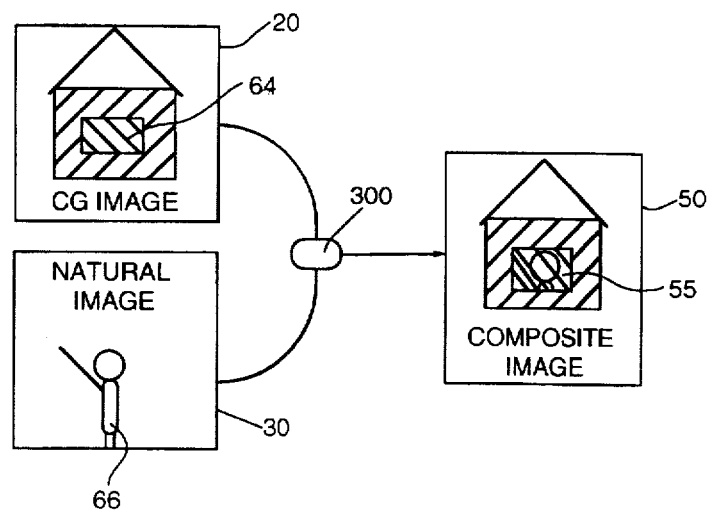

Referring to FIG. 8, a control template interface screen or window 400 is shown corresponding to a selection of the CONTROL TEMPLATES tool prompt 316 of the APPENDIX 315 in FIG. 7. The window 400 allows the user to define the type of control template that he is going to create for the selected process control function. A first area or field AREA OF CONTROL 402 is shown in the area 420 of the window 400 providing the user with information identifying the current screen prompt selected from the USER LIBRARY 230 in the APPENDIX 228 of additional screen prompts shown in FIG. 6. The interface area 420 also contains a second area described as a "TEMPLATE SET" scroll box 404, a third area designated as "TEMPLATES TO START FROM" scroll box 406, a fourth area designated as "TEMPLATE NAME" field box 408, a fifth area containing three control buttons 412 consisting of an "OK" button 412a, a "CANCEL" button 412b and a "HELP" button 412c, and a sixth area designated as "TEMPLATE DESCRIPTION" field box 410. The scroll boxes 404 and 406 provide a list of items on the left side of the boxes and scroll bars on the right side of the boxes. The user "scrolls" through the displayed list by clicking on the UP or DOWN arrows of the scroll bar shown in the boxes 404, 406 according to the desired direction of travel. The second area or TEMPLATE SET scroll box 404 contains screen prompts that allow the user to define the type of control template that he wishes to create. As shown in the box 404, the user can create a control template in a number of different graphical process control programming languages including continuous function block, ladder logic, or sequential function charting ("SFC"). It is understood that other graphical process control languages may also be supported within the process control environment 100 of the present invention.

In FIG. 8 assume the user has chosen the "<NEW> CONT" (continuous function block language) selection of the TEMPLATE SET scroll box 404, or the second area, as the type of control template that he wishes to create. As the user selects a particular process control language for the new control template, a list of predefined or existing templates that may be used as a starting point for designing the new control template appear in the third area, TEMPLATE TO START FROM box 406. This list pertains to all predefined or existing control templates in the control template library 122 that relate to the process control language selected in the TEMPLATE SET box 404. If the user selects one of the predefined control templates in the scroll box 406 as a base to start from, all of the existing attributes, methods, and graphical views associated with the selected, predefined template become the basis, or starting point, for the new control template. If the user does not wish to utilize any of the predefined control templates in the control template library 122 as a starting point, the prompt "<NEW>" can be selected from within the box 406.

Once a user selects the type of control template to be created or modified from within the scroll box 404 and selects the template to start from within the scroll box 406, a unique name for the new control template can then be entered within the field box 408. The name entered within the field box 408 will be the name of the new control template to be stored within the control template library 122 and will form the function block such as in FIG. 5 by which the new control template may be later accessed. In this illustration "PID-ADP" has been entered as the new template function block name. After naming the new control template, the user can then type a meaningful description of the new control template within the TEMPLATE DESCRIPTION field box 410. The template name and the template description provide a mechanism for referring to the new control template from within a control sheet or display screen programming environment and provide a means for describing the control template in process control reports and documentation.

In FIG. 8 it is seen that the user has designated the type of control template to be created as continuous function block, based on the control template PID, and has provided a unique name for identification of the control template as PID-ADP. If the user is satisfied that his selection of TEMPLATE SET, TEMPLATE TO START FROM, and TEMPLATE NAME are appropriate, the OK button 412a can be selected to save the parameters of his definition and then the user exits the interface window 400. If, however, the user wishes to exit the window 400 without saving the selections, the CANCEL button 412b can be selected. The HELP button 412c provides context-relative help information to the user.

Figure 9:
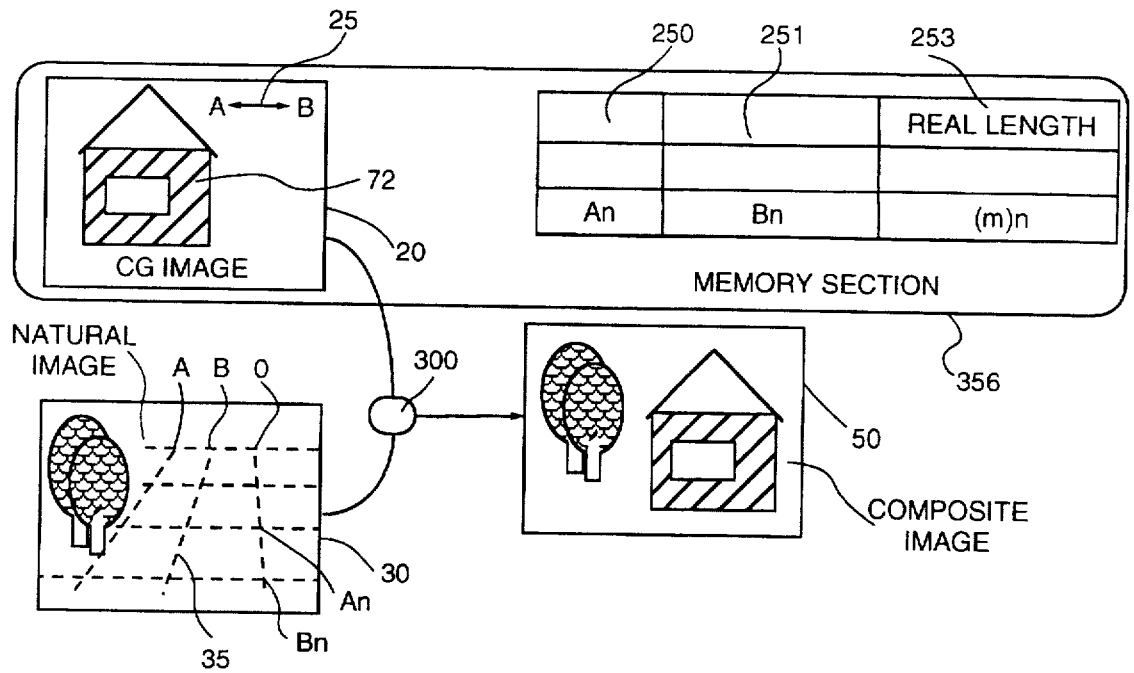

Referring to FIG. 9, an interface window 500 creation feature selection interface screen display is shown. It is provided to the user after he exits the window 400 via selecting the OK button 412a. A title bar 502 is provided in this and subsequent windows that shows the name and description of the new control template. In this case the TEMPLATE NAME is PID-ADP and the TEMPLATE DESCRIPTION is ADAPTIVE PID. At this point the user has the menu 506 to provide the ability to select creation features such as editing the attributes to be associated with the new control template (PID-ADP) by selecting an attributes definition window or screen, defining the methods that are to be associated with the new control template by selecting a methods definition window or screen, or creating the views to be associated with the new control template by selecting a views interface display window or screen. The selection of these creation features is performed by selecting the command EDIT from menu bar 504 and then choosing either the ATTRIBUTES, METHODS or VIEWS selection from the pull-down menu (not shown) selected by menu 506. Thus, the creation features or conversation sets such as designated by the numeral 42 in FIG. 5 for each view of the new or modified control template can be designed here.

Figure 10:
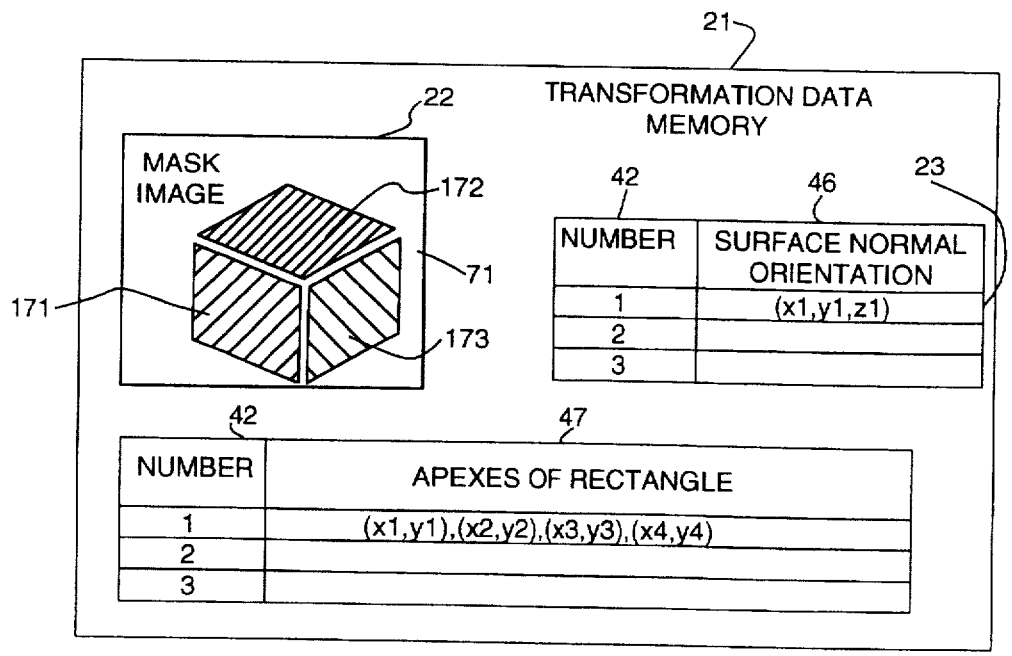

Referring to FIG. 10, an attribute definition window or screen 600 is shown that is provided to the user after choosing the ATTRIBUTES selection from the window 500 in the manner discussed above. The window 600 contains prompts that allow the user to define all of the attributes and associated conversation sets 42 that are to be used with a particular control template including the new control template. All attributes associated with the control templates and stored within the control template library 122 are defined within the attribute window 600. By providing for definition of all attributes associated with all control templates from within a single interface window, a common database structure for control template attributes is established so that all views of the process control function (engineer's, operator's, etc.) will be commonly affected by this information.

The attribute definition display screen or window 600 for the new control template referenced in title bar 620 includes a first area 602 for defining an ATTRIBUTE TYPE selection, a second area 604 for entering an ATTRIBUTE NAME, a third area containing screen prompts for a data format entitled ATTRIBUTE TO START FROM (scroll box 606), a fourth area defining CONVERSATION SETS (scroll box 608) associated with the selected attribute, and a fifth area containing three control buttons or screen prompts 610 including a DONE button 610a, a SAVE button 610b, and a DELETE button 610c. A control template consists of three types of attributes: input attributes, output attributes, and other attributes. The ATTRIBUTE NAME 604 is a unique name associated with each attribute selected for a control template. The ATTRIBUTES TO START FROM 606 relate to predefined attributes with which to start designing a new control template, or with attributes associated with an existing control template selected in the CONTROL TEMPLATES TO START FROM scroll box 406 of FIG. 8. Thus, when control template PID was selected in FIG. 8, the attributes associated with PID (i.e., mode, setpoint, and status) became available to the new control template PID-ADP as predefined attributes. The value for each of these attributes can be entered in the appropriate boxes. The CONVERSATION SET scroll box 608 contains a list of all conversations or parameters that are associated with the attribute selected in the scroll box 607. Again these conversations are intended to affect all screen display views of the new process control function.

The selection of attribute types to be associated with the new control template is defined within the ATTRIBUTE TYPE selection area 602. The interface for selection of the attribute type consists of three control buttons to allow selection of the attribute types INPUT, OUTPUT, or OTHER ATTRIBUTES. The user begins definition of each attribute to be associated with the new control template by clicking ON the control button associated with one of the three attribute types. The user then enters an ATTRIBUTE NAME within the ATFRIBUTE FIELD 604. In this instance the user has selected the attribute type OUTPUT in the selection area 602 and has given the output attribute the name "VO" in the field 604. It is understood that this attribute is associated with the new control template PID-ADP referenced in the title bar 20.

After selecting an attribute type and providing a name for the attribute, the user selects from the third area 606 the data format of the named attribute or the ATTRIBUTES TO START FROM. The allowed types of data formats pertain to the type of control language that was selected from the TEMPLATE SET in the second area, or scroll box 404, of FIG. 8. For the continuous control block language, the types of data formats include real numbers, enumerated values, boolean values, and text strings. It is understood that the types of data formats available in scroll box 606 may be different for ladder logic control templates, for example, but will relate directly to whatever process control programming languages are made available to the user within the scroll box 404 of FIG. 8. The selection of a data format for the named attribute is performed within the ATTRIBUTES TO START FROM scroll box 606. The user may either select one of the data formats from the box 606 or one of the predefined data formats in box 606 as discussed above. In FIG. 10, the defined data formats include MODE, SETPOINT, and STATUS. Each of these predefined data formats is of either real, enumerated, boolean, or string format.

When a user selects one of the four types of data from scroll box 606 a dialogue box appears that is associated with that data format. For purposes of illustration, the dialog box that is associated with the real data format (<NEW-Real>) is shown as box 612, the dialog box that is associated with the enumerated data format (<NEW-Enum>) is shown as 614, the dialogue box that is associated with the boolean (<NEW-Bool>) data format is shown as 616, and the dialogue box that is associated with the string data format (<NEW-String>) is shown as 618. Thus, when a user selects the real data format <NEW-Real>, the dialogue box 612 appears. The real box 612 allows the user to fill in the initial value of the attribute, the low and high values of the attribute and the measurement units associated with the attribute. Alternatively, if the user selects the enumerated data format <NEW-Enum> from the scroll box 606, box 614 is provided allowing the user to define at least two enumerated values for the attribute and associate those values with a name. If the user selects the boolean data format <NEW-Bool> from the scroll box 606, box 616 is provided allowing the user to define names associated with zero ("0") and one ("1") boolean conditions. Finally, if the user selects the string data format <NEW-String> from the scroll box 606, box 618 is provided allowing the user to enter textual information such as a name for association with the attribute.

The user now has defined the type of attribute (INPUT, OUTPUT, or OTHER ATTRIBUTE) in the selection area 602, the name of the attribute (in this illustration, "VO") in field 604, the data format for the attribute in box 606, and the specific data associated with the data format in box 612, 614, 616, or 618, depending on the data format selected in box 606. The user next selects a particular conversation to be associated with the attribute from the CONVERSATION SET scroll box 608. This list of conversations (608) includes various aspects of the attributes to be used that can be modified as desired by the user, each conversation set enabling the attribute value to be modified by the user by selecting a view in a display which references this attribute. See FIGS. 5A–5G and the discussion thereof. The list of conversations provided in box 608 is dependent on the type of data format selected in the box 606. Thus, one list of conversations is available for data type "Real", another for the data type "Enumerated", another for the data type "Boolean", and another for the data type "String", for example only.

After selecting a CONVERSATION SET from the box 608, a user may either delete or save the attribute just created by selecting the appropriate button 610a, 610b, or 610c. If the user selects the SAVE button 610b, the attribute just defined will be saved and a successive blank attribute definition window 600 will appear allowing the user to define another or second attribute to be selected with the new control template (130). When the user is finished defining all of the attributes to be associated with the new control template (130), the DONE control button 610a is selected thereby saving the last created attribute and exiting the attribute definition window 600.

Figure 11:
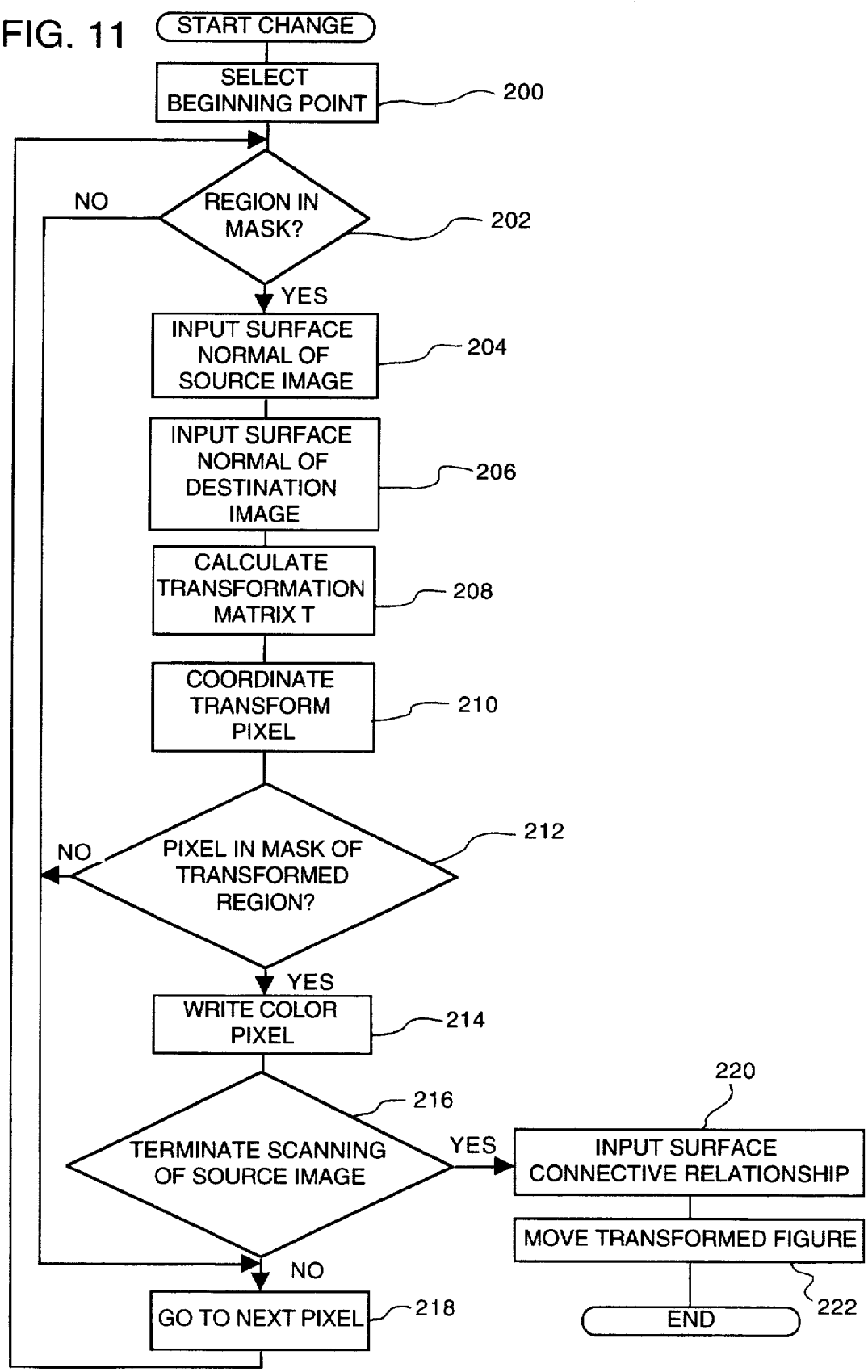

Referring to FIG. 11, a first methods definition display screen or window 700 is shown which is provided to the user after he has completed defining the attributes associated with the new control template by selection of the EDIT-METH-ODS command from the pull-down edit menu in the menu bar 504 in FIG. 9. Methods data forming part of the control template 130 is displayable in the form of display series 700 which contain appropriate algorithm and program data which, when related to the attributes data, form the process control solution. Thus, a "METHOD" is a program related to a control template that performs a process control function or a portion of a function. A METHOD may be written in Fortran, C, or any other programming language. The screen or window 700 includes a STARTING DIRECTORY scroll box 702, a function block or METHOD NAME field 704, a METHOD DESCRIPTION field 706, a STARTING METHOD scroll box 708, and three control buttons 710a, 710b and 710c. The STARTING DIRECTORY box 702 is a first area that includes a list of all control templates stored within the control template library 122. The STARTING METHOD box 708 is a second area that provides a list of all predefined methods associated with the control template selected from the scroll box 702. Once the control template is selected, the methods relating to the selected control template are available for selection in the second area defined as scroll box 708. In FIG. 11, the starting methods shown to be available are INIT, CHANGE PARM, and EXECUTE, for example only, and pertain to predefined methods associated with the control template PID that was selected as shown in FIG. 8.

Once the user selects the control template in the scroll box 702 and the starting method to be associated with the new control template in the scroll box 708, a name must be provided for the method within the METHOD NAME field or third area 704. The name represents the function block, such as 34, 36, 38, and 40 in FIG. 5, that defines the method and should be unique with respect to all other methods pertaining to the new control template so that the designed method template can be recalled as needed. After providing a method name, the user can place a description of the named method within the METHOD DESCRIPTION field or fourth area 706. The user then either saves or deletes the new method with an acceptance or rejection prompt by selecting the appropriate control button 710a, 710b, or 710c.

Figure 12:
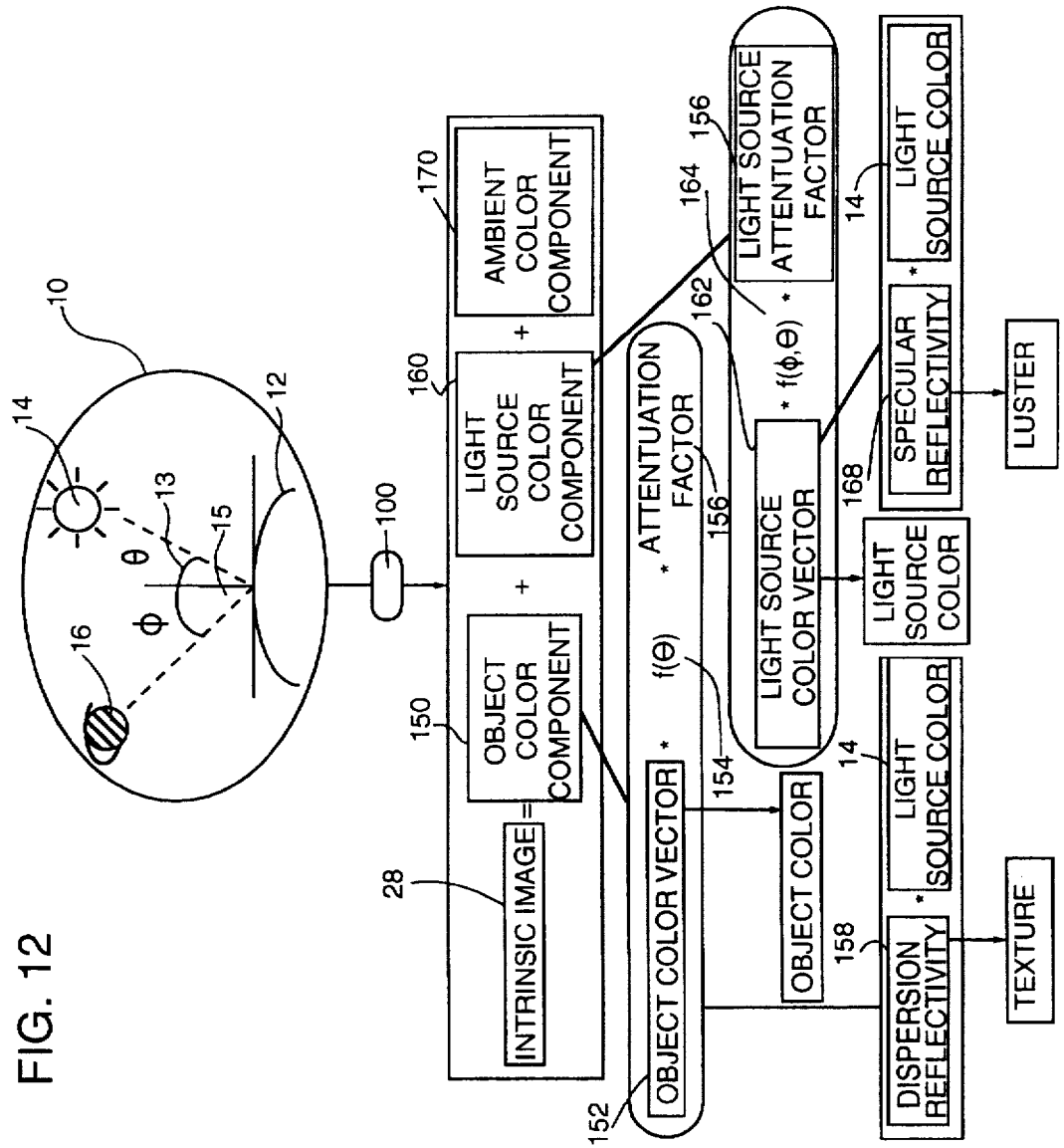

Referring to FIG. 12, a second method definition window or screen 800 is shown that is provided after a user selects the OK button or acceptance prompt 710a in FIG. 11. The second method definition window or screen 800 shows a programming text editor in the working area 802 that allows a user to write and/or edit a program relating to the named method defined by the first method definition screen in FIG. 11 and selected from box 708 therein. FIG. 12 shows, as an example, the INIT method selected as the starting method from the scroll box 708 of FIG. 11. The program within this editor can be developed using any of a number of well-known programming languages such as C, Fortran, or UPL and can utilize retrieved text files created in other programming environments. Once a program has been written using the text editor in area 802, the user can select the menu command FILE SAVE from menu bar 804 to save the written program designated by the named method. A user can then select the FILE-EXIT command from the menu bar 804 to exit the method definition screen interface 800. The process of defining the method named, as in FIG. 11, and writing the program for the method definition, as in FIG. 12, continues until all methods associated with the new control template have been developed. Next graphical views to be associated with the new control template are created by selecting the EDIT-VIEWS command from the pull-down menu bar 504 and then menu 506 of FIG. 9.

Figure 13:
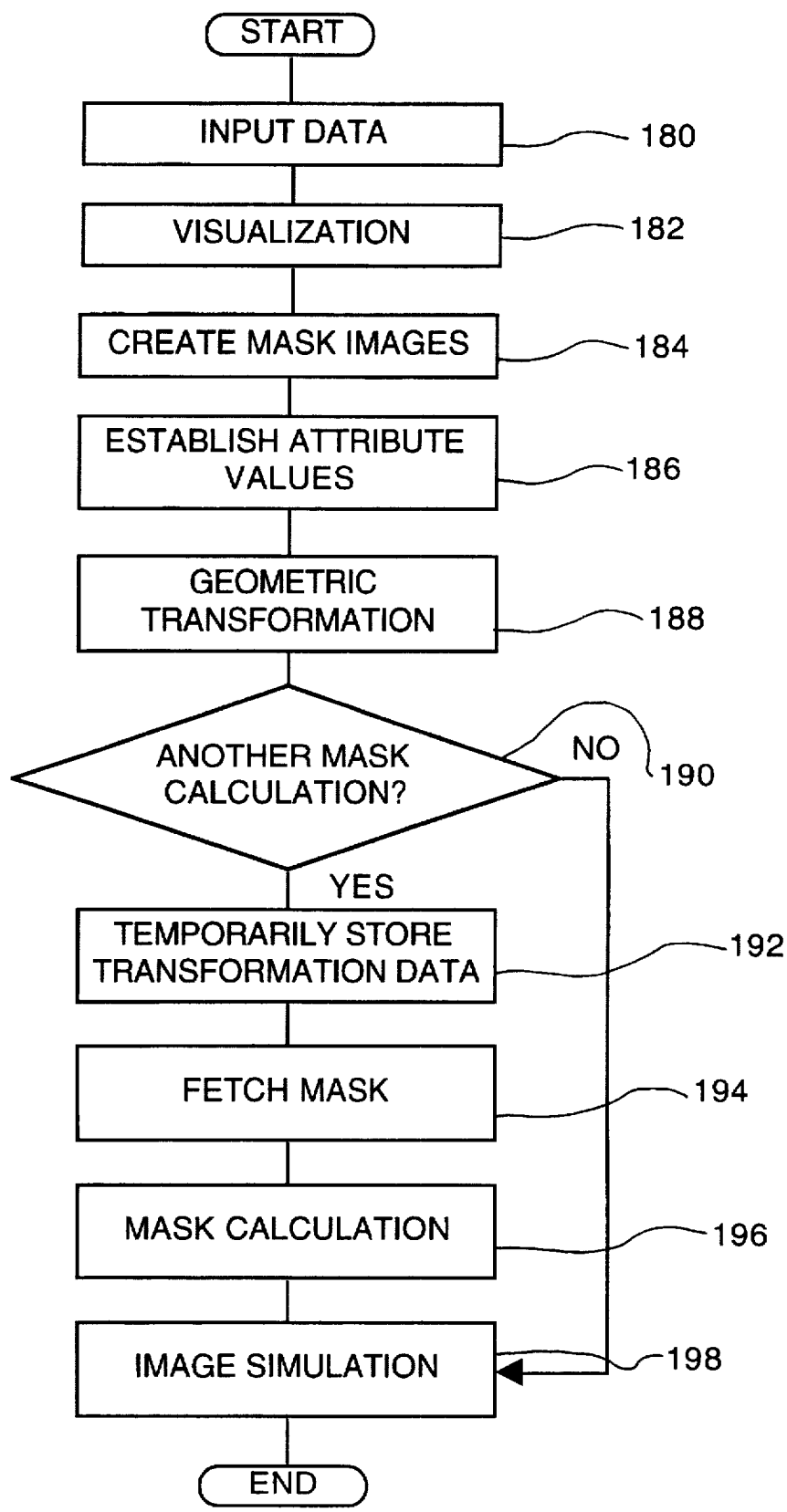

Referring to FIG. 13, a views definition window 900 is shown for creating the views to be associated with the new control template. The views window 900 includes a first area defining a STARTING DIRECTORY scroll box 902, a second area defining a STARTING VIEW scroll box 904, a third area defining a VIEW NAME field 906, a fourth area defining a VIEW DESCRIPTION field 908, and a fifth area including three control buttons 910 such as an OK button 910a, a CANCEL button 910b and a HELP button 910c. In a fashion similar to that of defining methods as discussed previously, the first area 902 of views window 900 contains screen prompts that allow the user either to base a view on any predefined view for any existing control template within the control template library 122 or to create an entirely new view. The second area or scroll box 904 contains screen prompts for selecting an ENGINEER VIEW, an OPERATOR VIEW, or a LAB VIEW, for example only. Other views such as maintenance and the like could also be created. These views were made available to the new control template PID-ADP when the PID control template was selected as the starting point from the third area 406 in FIG. 8. The engineer, operator, and lab views in the second area defining STARTING VIEW box 904 are the views that were created for the selected PID control template. A NEW starting view prompt can be selected in STARTING VIEW box 904 if desired. As shown in FIG. 13, the user has chosen the PID-ADP control template in the first area or scroll box 902 and the ENGINEER VIEW in the second area or scroll box 904 as the starting point for the creation of a new ENGINEER view for the PID-ADP control template. The user then defines a name for the new view in the third area or VIEW NAME field 906 and provides a description of the new view in the fourth area or VIEW DESCRIPTION field 908. Once the view name and description of the new view are defined, the user can use the fifth area to either cancel or continue by selecting the appropriate control button or screen prompt 910a, 910b, or 910c. Selecting prompt 910a causes a view interface design screen to be displayed shown in FIG. 14 that illustrates the created view of the engineering view, operator view, lab view, controller view, maintenance view, or other view.

Figure 14:
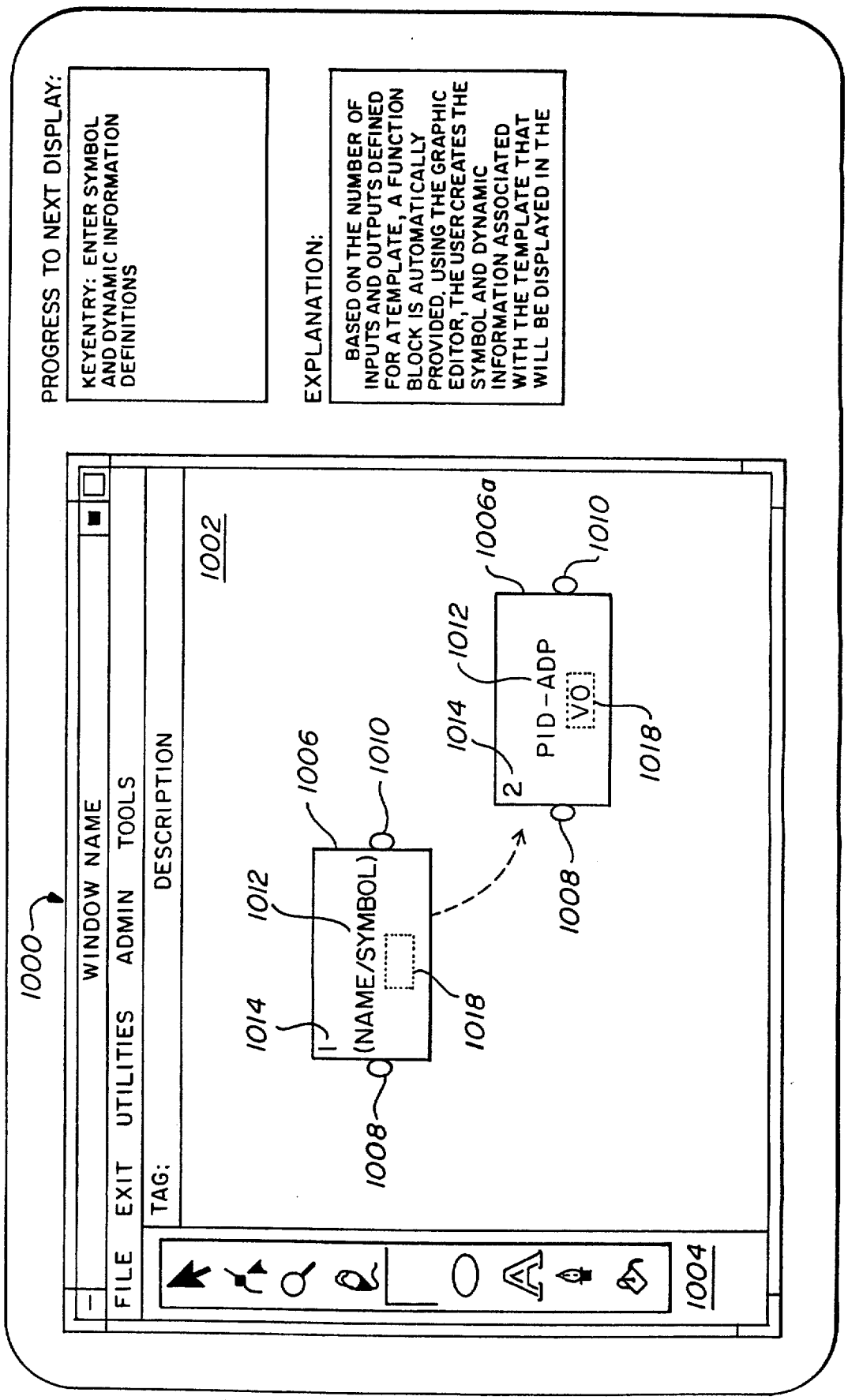
FIGS. 14 and 15 are workstation screen displays showing a graphical editor interface constructing an engineer's view and an operator's view, respectively.

Referring to FIG. 14, a view interface design display screen or window 1000 is shown. The design window 1000 includes a graphical editor in the working area 1002 and a palette of design tools 1004. Within the graphical editor in area 1002, an initial graphical view 1006 is provided which is based on the starting ENGINEER VIEW selected in the second area 904 of the views definition screen 900 shown in FIG. 13. The graphical view 1006 in this instance provides a starting point for developing a customized graphical view for the new PID-ADP control template. In creating a customized graphical view for control templates based upon a pre-existing view, the graphical editor provides the initial graphical view 1006 with an appropriate number of input and output nodes, corresponding to the number of input and output attributes defined previously in FIG. 10.

The selected ENGINEER VIEW shown in the initial graphical view 1006 includes several elements that are found in a typical engineer's view such as input nodes 1008, output nodes 1010, symbol names 1012, and tag reference numbers 1014. In addition, the graphical editor 1002 includes several elements that are new to typical engineer views, such as a smart field 1018. The smart field 1018 can provide information to the user regarding the value of an input or output or may even provide a real time chart of trend data relating to input or output values. Second graphical view 1006a represents a customized version of the initial graphical view 1006 generated by the user from the initial graphical view 1006 to include the custom information added by the user to form the new control template. In FIG. 14, a single input attribute 1008 and a single output attribute 1010 correspond to the attribute definitions for the PID-ADP control template. Once the view 1006a has been graphically defined, a user may execute the FILE SAVE command (not shown) from the menu bar to save the associated graphics view with its control template.

Figure 15:
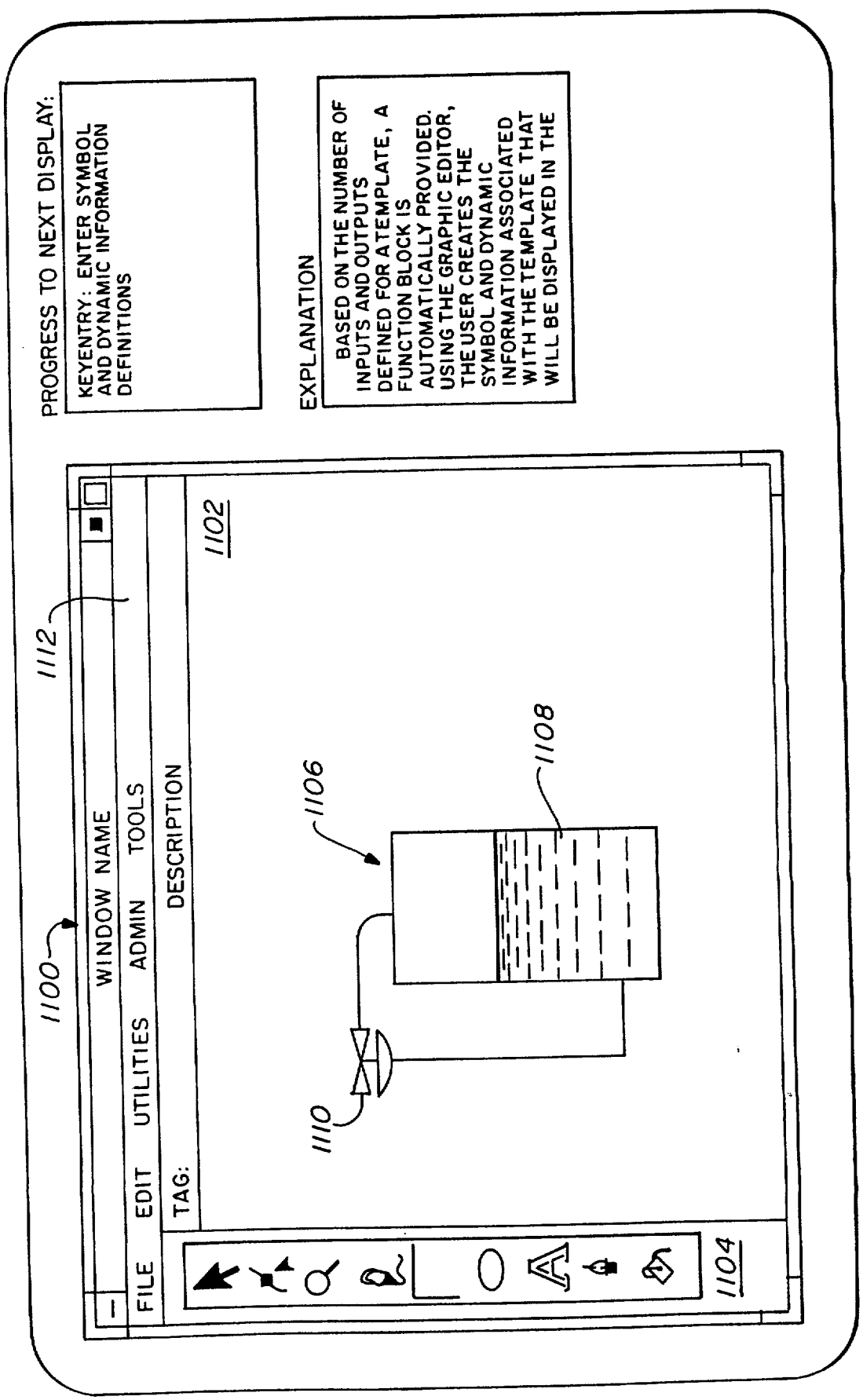

In addition to an engineer's view of the new control template, a user may also create other views such as operator's view 1106 of a control template, as shown in FIG. 15. An operator graphical interface screen 1100 is shown including a graphical tool palette 1104 for creating graphical views associated with the operator's view and a graphical editor in working area 1102 for the creation of the graphical views with the palette 1104 to be associated with the new or modified control template. A fill tank 1108 is shown connected to a flow control valve 1110 for regulating the flow of fluids to and from the fill tank. This graphical representation is an operator's view 11.06 of the PID-ADP control template and, when saved, will be directly associated with the created or modified control template. The user can save this operator view 1106 by selecting the command SAVE (not shown) under the menu item FILE from menu bar 1112.

Referring to FIG. 16, an overview is shown of the information provided during the example used herein of the process of creating a new control template PID-ADP. The overview includes an attribute definition 1200, a method definition 1202, and graphic definition 1204. The attribute definition 1200 contains the attribute information selected by the user with the screen prompts in FIGS. 8–10. This information includes the attribute usage, the type of attributes associated with the control template PID-ADP, the name of the attributes, the range (if appropriate) of the attributes, the default values (if appropriate) of the attributes, the default values (if appropriate) of the attributes, and the particular conversation associated with each attribute. The method definition 1202 pertains to the information selected by the user with the screen prompts in FIGS. 7 and 8. The graphic definition 1204 pertains to information selected by the user with screen prompts in FIGS. 13–15. This information includes a graphical icon 1216 pertaining to the engineer's view of the control template PID-ADP, the graphical icon 1218 representing the operator's view of the control template PID-ADP, and the graphical icon 1219 representing the instrument technician's view of the control template. Each view may show selected attribute values numerically or indirectly through graphical techniques such as bar graphs, etc.

It is understood that variations may be made in the present invention without departing from the spirit and scope of the invention. For example, the window or screen display interfaces shown in FIGS. 6–15 could be provided in a nonwindowing environment such as DOS™ or UNIX®. In addition, the parameters available for definition in the attributes, methods, and graphics definition windows could be located within any interface screen, but have been shown as above for purposes of clarity. Moreover, graphical process control programming languages, other than continuous control block or ladder logic, could be supported within the control template design environment of the present invention while maintaining the definitional structure of the template generator.

Although a preferred embodiment of the present invention has been shown and described, a latitude of modification, change and substitution is intended in the foregoing disclosure and, in certain instances, some features of the invention will be employed without a corresponding use of other features. Accordingly, it is appropriate that the appended claims be construed broadly and in a manner consistent with the scope of the invention.

I claim:

1. A process control system which performs process control functions in a process environment using control templates, each template representing a selected process control function for a control environment and in which different control template views of a selected process control function may be displayed, the system comprising:

A. a central processing unit;
   B. a plurality of control templates that can be accessed by the central processing unit wherein each control template includes:
   (1) process control function information;
   (2) attribute information pertaining to the process environment;
   (3) a conversation set associated with the process control function information and the attribute information which enables a user to interact with the attribute information in a manner specified by a selected control template view; and
   (4) control method instructions which use the attribute information and the conversation set to perform a process control function;
   C. a user-interface device coupled to the central processing unit which enables a user to select a control template for display, including means for systematically prompting the user to input control template information comprising one of the attribute information, the conversation set and the control method instructions for a control template; and
   D. a control template generator which includes instructions that automatically generate a control template in response to the control template information input by the user.

2. The process control system of claim 1 wherein each of said control templates includes a plurality of selectable control template views of the selected process control function.

3. The process control system of claim 1 wherein each of said control templates has a plurality of conversation sets associated with the process control function information and the attribute information.

4. The process control system of claim 1 wherein the control method instructions are created using a programming language.

5. The process control system of claim 1 further comprising a control template library for storing data representing the plurality of control templates.

6. The process control system of claim 5 wherein the control template library further comprises:

data representing a first set of control templates including predefined control templates; and data representing a second set of control templates created by the user.

7. The process control system of claim 1 wherein each control template further includes a control template view and wherein the template generator is interconnected with the central processing unit and the user-interface device, and permits a user to edit existing control templates or create new control templates by accessing and changing the data representing the process control function information, the attribute information, the conversation set, the control method instructions, or the control template view.

8. The process control system of claim 7 wherein said template generator includes a graphics generator for allowing the user to design graphical views to be associated with the selected functions for the created or edited control template.

9. The process control system of claim 1 wherein said control method instructions are selectable by a user.

10. The process control system of claim 1 further comprising:
a display device forming a part of the user-interface device; and
a template generator interface screen viewed on the display device and having a plurality of screen prompts for selection by a user, said user-interface device enabling the user to access the attribute information and the control method instructions so as to edit or create a new control template.

11. The system of claim 1 further comprising stored equipment data that can be accessed by a user using the user-interface display for displaying the physical arrangement of equipment associated with one of the control templates.

12. The system of claim 11 further comprising display means for allowing the user to monitor the operation of the equipment with the user-interface device.

13. The system of claim 1 wherein the process control information includes one of an algorithm and a known control parameter of the control process.

14. The system of claim 1 wherein the attribute information includes information regarding one of a process input and a process output.

15. A memory including a control template representing a selected function of a control process for a process environment, the template being used to generate a plurality of displayable views of the selected function, said template comprising:
process control function information;
attribute information pertaining to the process environment;
a conversation set associated with the process control function information and the attribute information which enables a user to interact with the attribute information in a manner specified by a selected control template view;
control method instructions which use the attribute information and the conversation set to perform a process control function; and
a plurality of control template views capable of simultaneously displaying different views of the same process control function wherein each of the control template views uses the conversation set to enable a user to interact with the control process in a different manner.

16. The control template of claim 15 wherein one of the control template views reflects one of a process control engineer view, a process control operator view, a lab technician view, and a maintenance technician view.

17. The control template of claim 15 further comprising a plurality of conversation sets associated with the process control function information and the attribute information.

18. The control template of claim 15 wherein the process control function information includes one of an algorithm and a known control parameter of the control process.

19. The control template of claim 15 wherein the attribute information includes information regarding one of a process input and a process output.

20. A method of creating or editing control templates for a process control system which performs process control functions in a process environment, each template representing a selected process control function for a control environment in which different control template views of a selected process control function may be displayed, the method comprising the steps of:

A. accessing a plurality of control templates with a central processing unit wherein each control template includes:
(1) process control function information;
(2) attribute information pertaining to the process environment;
(3) a conversation set associated with the process control function information and the attribute information which enables a user to interact with the attribute information in a manner specified by a selected control template view; and
(4) control method instructions which use the attribute information and the conversation set to perform a process control function;

B. coupling a user-interface device to the central processing unit;

C. enabling a user to select a control template for display with the user-interface device;

D. systematically prompting the user to enter control template information comprising one of the attribute information, the conversation set and the control method instructions; and E. automatically generating a control template according to instructions in response to the control template information input in step D.

21. The method of claim 20 further comprising the step of providing a plurality of selectable control template views of the selected process control function for each of said control templates.

22. The method of claim 20 further comprising the step of associating a plurality of conversation sets with the process control function information and the attribute information for each of said control templates.

23. The method of claim 20 further comprising the step of creating said control method instructions using a programming language.

24. The method of claim 20 further comprising the step of storing data representing the plurality of control templates in a control template library.

25. The method of claim 24 wherein the step of storing data representing the plurality of control templates in a control template library further comprises the steps of:
storing data representing a first set of control templates including predefined control templates; and
storing data representing a second set of control templates created by the user.

26. The method of claim 20 further comprising the steps of:
providing each control template with a control template view;
providing a template generator interconnected with the central processing unit and user-interface device; and editing existing control templates or creating new control templates using the template generator by accessing and changing the data representing the process control function, the attribute information, the conversation set, the control method instructions, or the control template view.

27. The method of claim 26 further comprising the steps of:

including a graphics generator with the template generator; and using the graphics generator to design graphical views to be associated with the selected functions for the created or edited control template.

28. The method of claim 20 further comprising the step of selecting a predetermined one of said control method instructions for performing the process control function.

29. The method of claim 20 further comprising the steps of:

including a display device as a part of the user-interface device;

providing a template generator interface screen to be viewed on the display device and having a plurality of screen prompts for selection by a user; and accessing the attribute information and the control method instructions with said user-interface device so as to edit or create a new control template.

30. The method of claim 20 further comprising the steps of:

storing equipment dam; and accessing the stored equipment data using the user-interface device for displaying the physical arrangement of equipment associated with a control template.

31. The method of claim 30 further comprising the step of monitoring the operation of the equipment with a user-interface display device.

32. The method of claim 20 further comprising the step of including one of an algorithm and a known control parameter of the control process in the process control information.

33. The method of claim 20 further comprising the step of including information regarding one of a process input and a process output as the attribute information.

34. A method for creating a process control solution using a control template which represents a selected function of a control process for a process environment to generate a plurality of displayable views of the selected function, said method comprising the steps of:

providing process control function information;

providing attribute information pertaining to the process environment;

providing a conversation set associated with the process control function information and the attribute information which enables a user to interact with the attribute information in a manner specified by a selected control template view;

generating a plurality of simultaneously displayable views of the selected function wherein each displayable view uses the conversation set to allow a user to interact with the attribute information in a different manner; and using control method instructions to form the process control solution with the attribute information, the conversation set and the plurality of displayable views.

35. The method of claim 34 further comprising the step of relating the conversation set to control parameters of the control process in terms of a selected one of the displayable views.

36. The method of claim 35 further comprising the step of using the displayable views to reflect one of a process control engineer view, a process control operator view, a lab technician view, and a maintenance technician view.

37. The method of claim 35 further comprising the step of including one of an algorithm and a known control parameter of the control process in the process control function information.

38. The method of claim 35 further comprising the step of including information regarding one of a process input and a process output as the attribute information.

39. The method of claim 34 further comprising the step of associating a plurality of conversation sets with the process control function information and the attribute information.

40. A computer system for generating control templates used in designing control solutions for a process controller in a process control environment, said system comprising:

means for systematically prompting a user to specify a control attribute, control software for processing said attribute and a graphic representation for the unique control template;

generator means for generating a unique control template by automatically grouping the control attribute, the control software selected by the user for processing said attribute, and the graphic representation of said unique control template in a manner useable by the process controller;

a display for providing a visual interface between a user and said generator means to view said unique template;

means for allowing the user to communicate with said generator means including software which allows a user to change said control attributes, said control software, or said graphic representation of said unique control template; and storage means for storing said unique control template to allow the user to thereafter select and recall the unique template for designing a control solution on said display.

41. A method for generating control templates used in designing control solutions in a process control environment using a computer system, said method comprising the steps of:

systematically prompting a user to specify a control attribute, control software for processing said attribute and a graphic representation for a unique control template;

generating a unique control template by grouping the control attribute, control software selected by the user for processing said attribute, and the graphic representation of said unique control template;

providing a visual interface between a user and said generator means to view said unique template;

providing an interface device including software which allows the user to communicate with said generator means to change said control attributes, said control software, or said graphic representation of said unique control template; and storing said unique control template to allow the user to thereafter select and recall the unique template for designing a control solution on said display.

* * * * *

UNITED STATES PATENT AND TRADEMARK OFFICE
CERTIFICATE OF CORRECTION

PATENT NO.  :  5,594,858

DATED       :  January 14, 1997

INVENTOR(S) :  Blevins, T.

It is certified that error appears in the above-identified patent and that said Letters Patent is hereby corrected as shown below:

The title page, showing the illustrative figure, should be deleted and substitute therefor the attached title page.

Delete Figs. 1-13 and substitute the attached Figs. 1-16 therefor.

Signed and Sealed this

Twenty-ninth Day of July, 1997

*Attest:*

BRUCE LEHMAN

*Attesting Officer*     *Commissioner of Patents and Trademarks*

United States Patent [19]

Blevins

[11] Patent Number: 5,594,858
[45] Date of Patent: Jan. 14, 1997

[54] UNIFORM CONTROL TEMPLATE GENERATING SYSTEM AND METHOD FOR PROCESS CONTROL PROGRAMMING

[75] Inventor: Terrence L. Blevins, Round Rock, Tex.

[73] Assignee: Fisher-Rosemount Systems, Inc., Clayton, Mo.

[21] Appl. No.: 98,790

[22] Filed: Jul. 29, 1993

[51] Int. Cl.$^6$ .............................. G06F 15/00
[52] U.S. Cl. ................................. 395/326
[58] Field of Search ..................... 395/155–161

[56] References Cited

U.S. PATENT DOCUMENTS

| | | | |
|---|---|---|---|
| 4,443,861 | 4/1984 | Slater | 395/275 |
| 4,455,619 | 6/1984 | Masui et al. | 395/160 |
| 4,656,603 | 4/1987 | Dunn | 395/2 |
| 4,663,704 | 5/1987 | Jones et al. | 364/188 |
| 4,679,137 | 7/1987 | Lane et al. | 364/188 |
| 4,736,320 | 4/1988 | Bristol | 395/700 |
| 4,843,538 | 6/1989 | Lane et al. | 364/188 |
| 4,849,880 | 7/1989 | Bhaskar et al. | 395/161 |
| 4,866,638 | 9/1989 | Cosentino et al. | 395/159 |
| 4,910,691 | 3/1990 | Skeirik | 395/11 |
| 4,914,568 | 4/1990 | Kodosky et al. | 395/159 |
| 4,934,399 | 6/1990 | Cho | 137/14 |
| 4,965,742 | 10/1990 | Skeirik | 364/191 |
| 4,975,643 | 12/1990 | Buchwald | 324/207.12 |
| 4,976,144 | 12/1990 | Fitzgerald | 73/168 |
| 4,991,076 | 2/1991 | Zifferer et al. | 364/147 |
| 5,006,976 | 4/1991 | Jundt | 364/184 |
| 5,019,961 | 5/1991 | Addesso et al. | 364/192 |
| 5,021,976 | 6/1991 | Wexelblat et al. | 395/159 |
| 5,072,412 | 12/1991 | Henderson, Jr. et al. | 395/159 |
| 5,163,130 | 11/1992 | Hullot | 395/148 |
| 5,214,756 | 5/1993 | Franklin et al. | 395/159 |
| 5,226,118 | 7/1993 | Baker et al. | 395/161 |
| 5,257,349 | 10/1993 | Alexander | 395/159 |
| 5,287,439 | 2/1994 | Koga et al. | 395/133 |
| 5,293,476 | 3/1994 | Wolber et al. | 395/159 |
| 5,301,301 | 4/1994 | Kodosky et al. | 395/500 |
| 5,313,575 | 5/1994 | Beethe et al. | 395/159 |
| 5,353,400 | 10/1994 | Nigawara et al. | 395/161 |
| 5,353,401 | 10/1994 | Iizawa et al. | 395/161 |

FOREIGN PATENT DOCUMENTS

WO91/19237  12/1991  WIPO.

OTHER PUBLICATIONS

Microsoft Corporation; Microsoft Access Basic: An Introduction to Programming; 1992; p. 139–147.

Hollan et al.; *Graphics Interfaces for Simulation;* 1987; pp. 129–163.

Robinson et al.; *An Application of Object-Oriented Programming to Process Simulation;* Aug. 1988; pp. 1–9.

Walters et al.; *Modeling Made Easy: The Synthetic Intelligence (SI) Approach;* 1988; pp. 78–90.

Elmqvist, Hilding, An Object and Data–Flow Based Visual Language for Process Control, ISA/92–Canada Conference & Exhibit, Toronto, Ontario, Canada, Apr. 28–30, 1992, pp. 1–12.

Elmqvist, Hilding, Cooperating Distributed Control Objects, IFAC Symposium on Distributed Intelligence Systems, Arlington, Virginia, USA, Aug. 13–15, 1991, pp. 1–6.

(List continued on next page.)

Primary Examiner—Heather R. Herndon
Assistant Examiner—Joseph R. Burwell
Attorney, Agent, or Firm—Marshall, O'Toole, Gerstein, Murray & Borun

[57] ABSTRACT

A control template represents a selected function of a control process for a control environment and being used to generate a plurality of displayable views of the selected function. The template includes process control information such as algorithms and known control parameters of the control process, attribute information for the process environment such as inputs and outputs, at least one conversation set associated with the process control function information for relating specific control parameters of the control process in terms of a selected control template view and control method instructions that use the attribute information and at least one conversation set to form a process control solution. A system creates or modifies the control template.

41 Claims, 10 Drawing Sheets

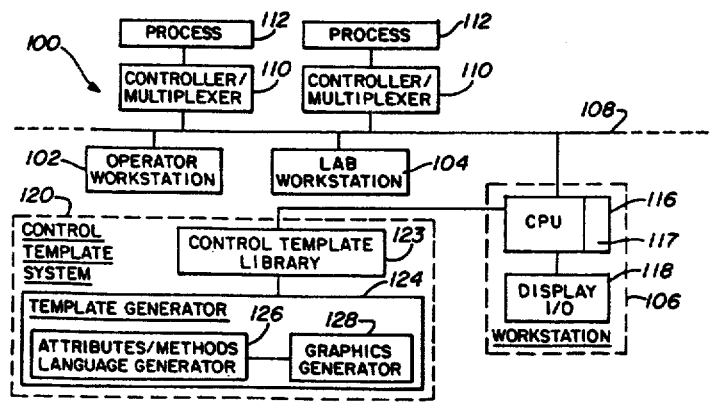

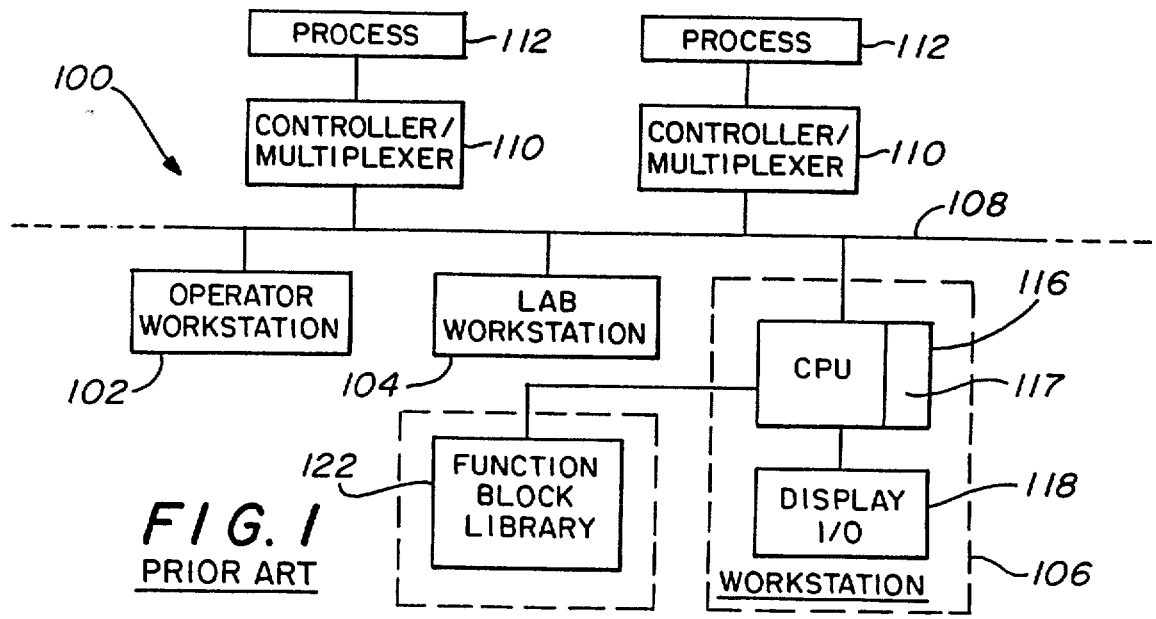
FIG. 1 PRIOR ART
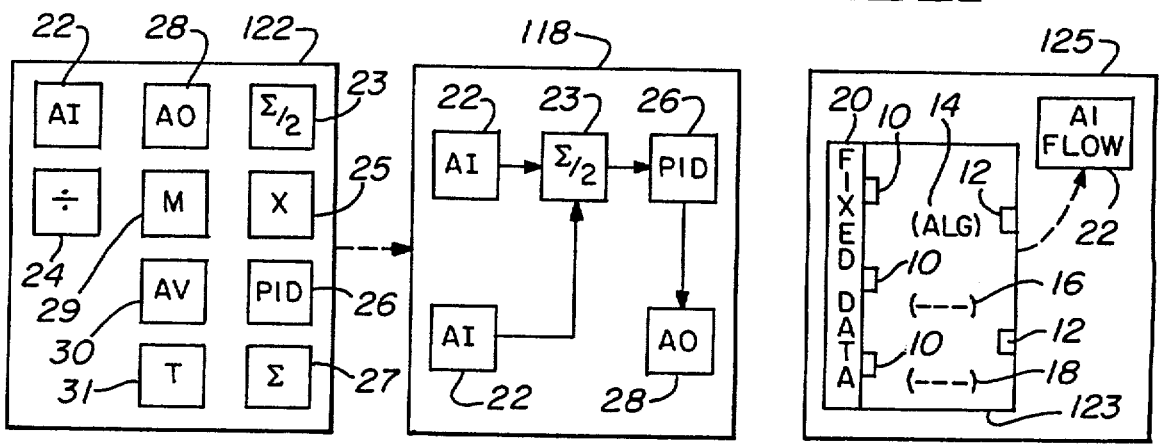
FIG. 2 PRIOR ART
FIG. 3 PRIOR ART
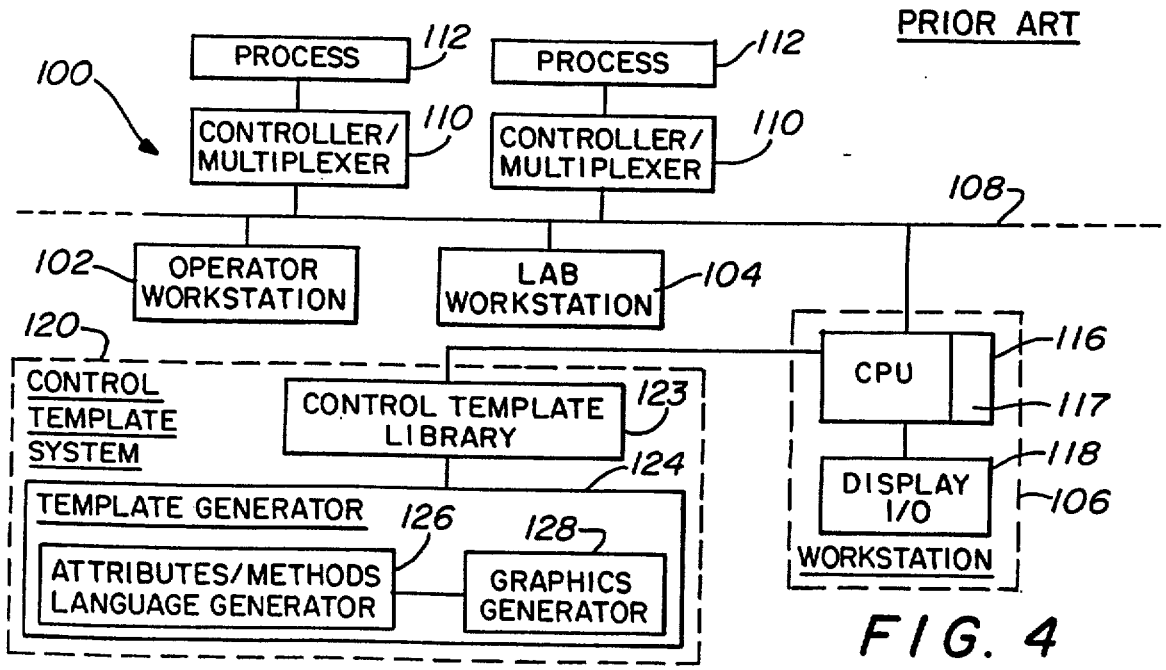
FIG. 4

BLOCK NAME: PID-ADP                                                   1200

| ATTRIBUTE USAGE: | TYPE   | NAME | RANGE          | CONVERSATION |
|------------------|--------|------|----------------|--------------|
| INPUT            | REAL   | PV   | -1E-10 TO 1E10 | CONV#10      |
| OUTPUT           | REAL   | VO   | -1E-10 TO 1E10 | CONV# 9      |
| OTHER ATTRIBUTE  | ENUM   | MODE | MAN. AUTO      | CONV# 1      |
| OTHER ATTRIBUTE  | REAL   | SP   | -1E-10 TO 1E10 | CONV#33      |
| OTHER ATTRIBUTE  | STRING | TAG  | 13 CHARACTERS  | CONV#22      |

METHOD:                                                               1202
(PROCEDURE LANGUAGE OR C CODE...REFERENCE ATTRIBUTES BY NAME)

1204

GRAPHIC FOR ENGINEER

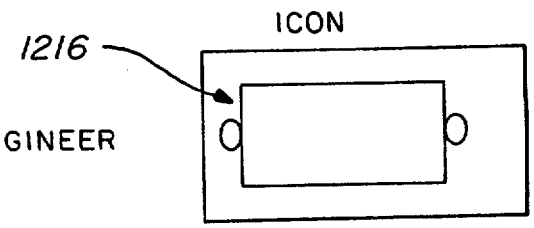

GRAPHIC FOR OPERATOR

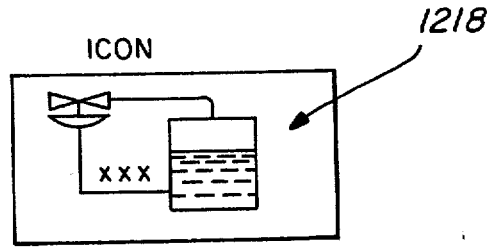

GRAPHIC FOR INSTRUMENT TECHNICIAN

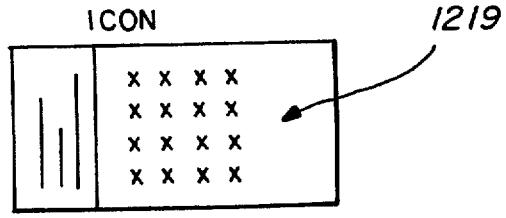

FIG. 16